US012607642B2

(12) United States Patent
Fang et al.

(10) Patent No.: US 12,607,642 B2
(45) Date of Patent: Apr. 21, 2026

(54) OBJECT STAGE AND TRANSFER PLATFORM FOR BIOLOGICAL SAMPLE ANALYZER, AND BIOLOGICAL SAMPLE ANALYZER

(71) Applicant: LEADWAY (HK) LIMITED, Hong Kong (CN)

(72) Inventors: Wei Fang, Hangzhou (CN); Linyong Tang, Hangzhou (CN); Tao Shang, Hangzhou (CN); Zhongping Wang, Hangzhou (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 493 days.

(21) Appl. No.: 17/758,807

(22) PCT Filed: Mar. 16, 2021

(86) PCT No.: PCT/CN2021/080953
§ 371 (c)(1),
(2) Date: Jul. 14, 2022

(87) PCT Pub. No.: WO2021/143953
PCT Pub. Date: Jul. 22, 2021

(65) Prior Publication Data
US 2023/0044723 A1     Feb. 9, 2023

(30) Foreign Application Priority Data

Jan. 16, 2020     (CN) .......................... 202010048939.0
Jun. 25, 2020     (CN) .......................... 202010592923.6
(Continued)

(51) Int. Cl.
*G01N 35/00*          (2006.01)
*B01L 3/00*           (2006.01)

(52) U.S. Cl.
CPC ...... *G01N 35/00029* (2013.01); *B01L 3/5023* (2013.01); *B01L 2200/025* (2013.01); *B01L 2300/069* (2013.01)

(58) Field of Classification Search
CPC ... G01N 35/00029; G01N 2035/00108; G01N 2035/00148; G01N 33/52; G01N 35/04;
(Continued)

(56) References Cited

U.S. PATENT DOCUMENTS 6,239,445 B1     5/2001   Nazeer
7,118,713 B2    10/2006   Brock et al.

FOREIGN PATENT DOCUMENTS

CN     205404421 U     7/2016
CN     207051295 U     2/2018
(Continued)

OTHER PUBLICATIONS

International Search Report issued in PCT/CN2021/080953 dated Jun. 3, 2021—incl Engl lang transl (5 pages total).
(Continued)

*Primary Examiner* — Samuel P Siefke
(74) *Attorney, Agent, or Firm* — Michael A. Whittaker

(57)          ABSTRACT

The present invention relates to a transfer platform for a biological sample analyzer, comprising a movable carrier plate and an object stage which is placed on the carrier plate and separable from the carrier plate. The side of the carrier plate facing the object stage is an upper surface, and the reverse side is a lower surface. The side of the object stage facing the carrier plate is a lower surface, and the reverse side is an upper surface. The object stage and the carrier plate are respectively provided with magnetic blocks that magnetically attract each other. When the object stage is placed in a predetermined area on the carrier plate, the suction of the magnetic blocks automatically positions the
(Continued)

object stage relative to the carrier plate, thereby achieving the technical effect of blind positioning. The present invention can be applied to test analyzers for specific proteins, cholesterol, heme, routine urine test, dry biochemical test, etc. The present invention has the advantages of convenient operation, time and effort saving, high efficiency and the like. Meanwhile, the present invention is simple in structure and low in cost, and is suitable for wide promotion.

14 Claims, 15 Drawing Sheets

(30) Foreign Application Priority Data

| | | | |
|---|---|---|---|
| Jun. 25, 2020 | (CN) | .......................... | 202021200373.0 |
| Jun. 25, 2020 | (CN) | .......................... | 202021200379.8 |

(58) Field of Classification Search
CPC ............. B01L 3/5023; B01L 2200/025; B01L 2300/069; B01L 2300/0825; B01L 9/527
See application file for complete search history.

(56) References Cited

FOREIGN PATENT DOCUMENTS

| CN | 107831327 | A | 3/2018 |
|---|---|---|---|
| CN | 108593900 | A | 9/2018 |
| CN | 109696555 | A | 4/2019 |
| CN | 209362886 | U | 9/2019 |
| CN | 110455845 | A | 11/2019 |
| CN | 212255369 | U | 12/2020 |
| CN | 213302233 | U | 5/2021 |
| CN | 213482251 | U | 6/2021 |
| CN | 213482252 | U | 6/2021 |
| CN | 213482253 | U | 6/2021 |
| CN | 213482254 | U | 6/2021 |
| CN | 113125690 | A | 7/2021 |
| CN | 113138285 | A | 7/2021 |
| CN | 113203871 | A | 8/2021 |
| CN | 213875703 | U | 8/2021 |
| DE | 1012218377 | B3 | 11/2013 |
| WO | 2019150312 | A1 | 8/2019 |

OTHER PUBLICATIONS

International Preliminary Report on Patentability issued in PCT/CN2021/080953 dated Jul. 19, 2021—incl Engl lang transl (12 pages total).

Extended European Search Report issued in EP 21740762 dated Jan. 29, 2024 (37 pages).

First Office Action issued by CNIPA in Chinese Patent Application No. 202010592902.4 dated Dec. 26, 2023—incl Engl lang transl (13 pages total).

First Office Action issued by CNIPA in Chinese Patent Application No. 202010048939.0 dated Jun. 30, 2022—incl Engl lang transl (10 pages total).

First Office Action issued by CNIPA in Chinese Patent Application No. 202010592923.6 dated Jun. 30, 2022—incl Engl lang transl (11 pages total).

First Office Action issued by CNIPA in Chinese Patent Application No. 202010592884.X dated Dec. 22, 2023—incl Engl lang transl (17 pages total).

Extended European Search Report issued in European Patent Application No. 21740762.6 dated Oct. 9, 2025 (7 pages).

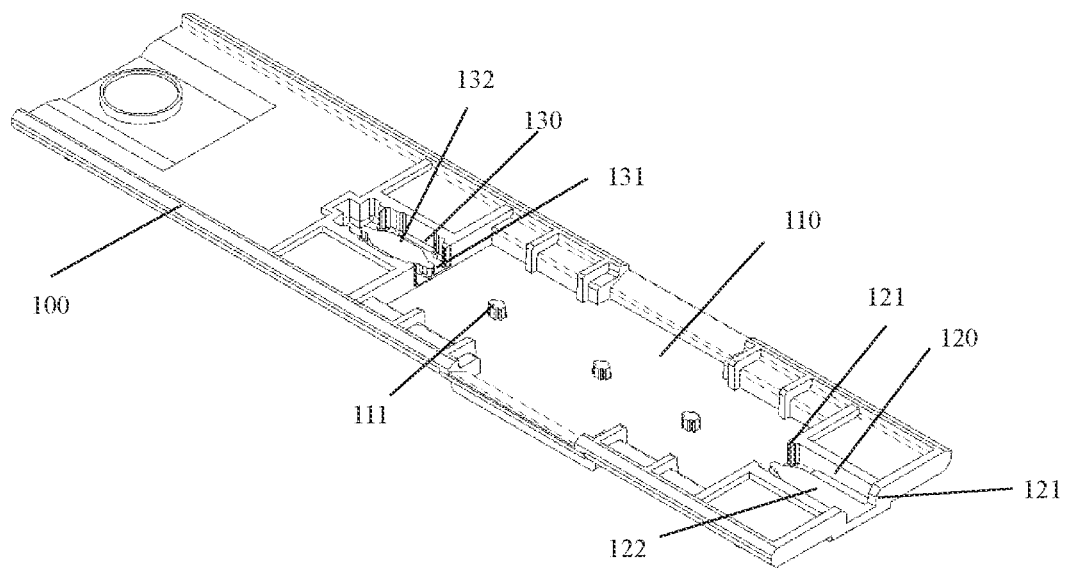
Fig.1
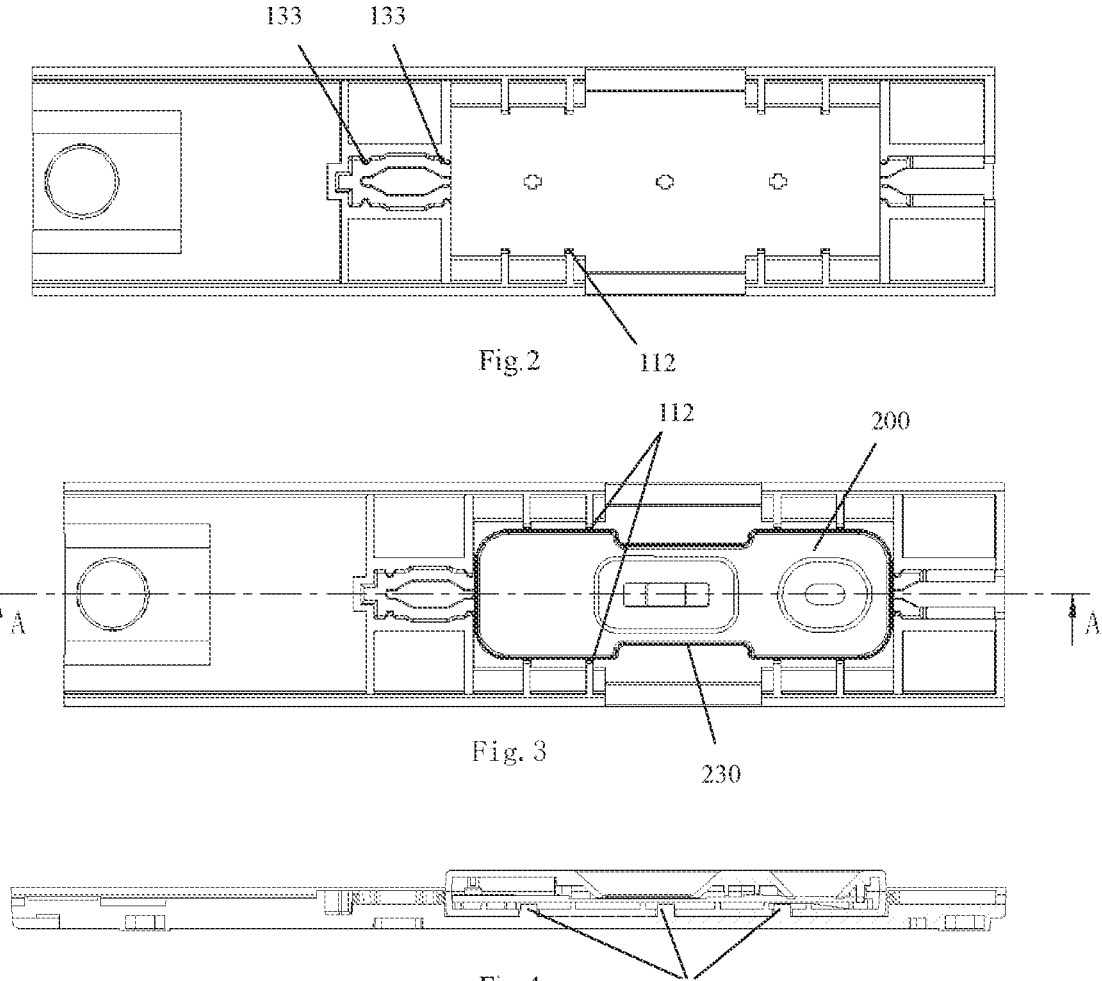
Fig.2
Fig.3
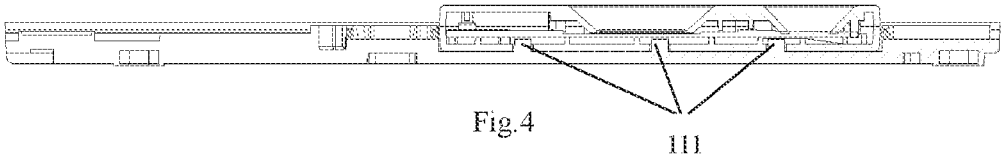
Fig.4

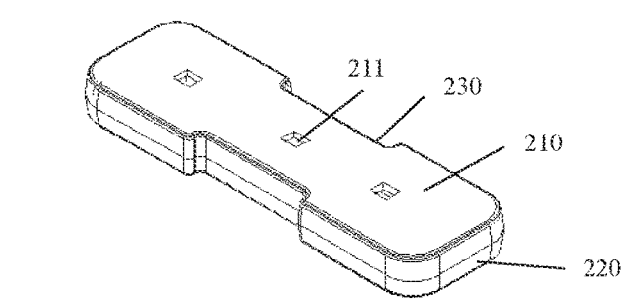
Fig.5
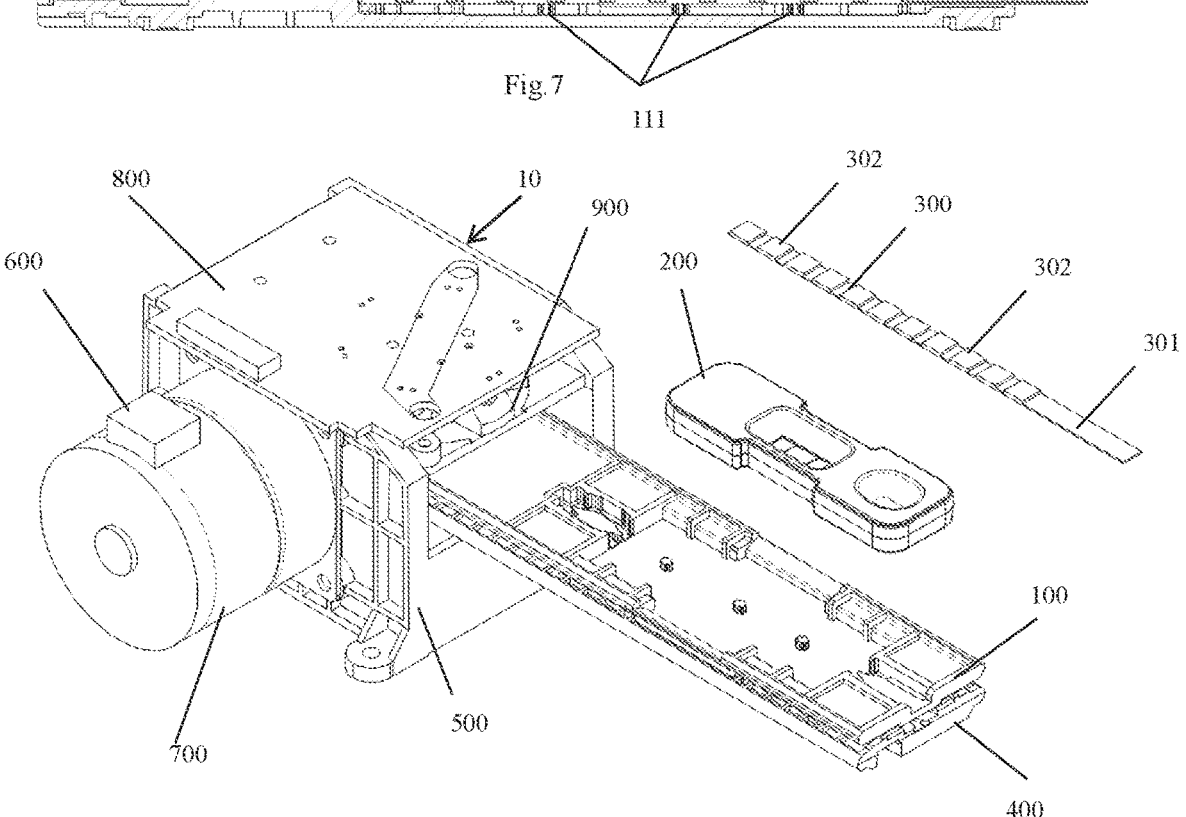
Fig.6
Fig.7
Fig.8

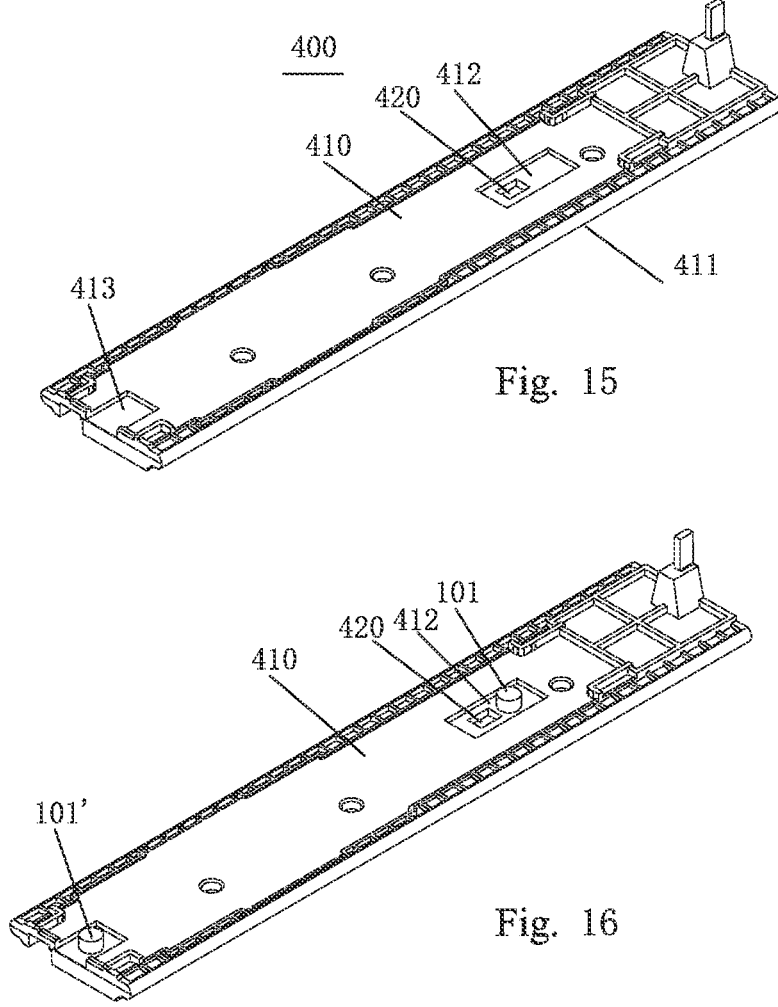
Fig. 15
Fig. 16
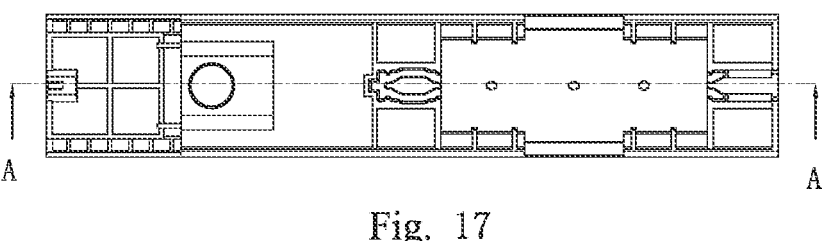
Fig. 17

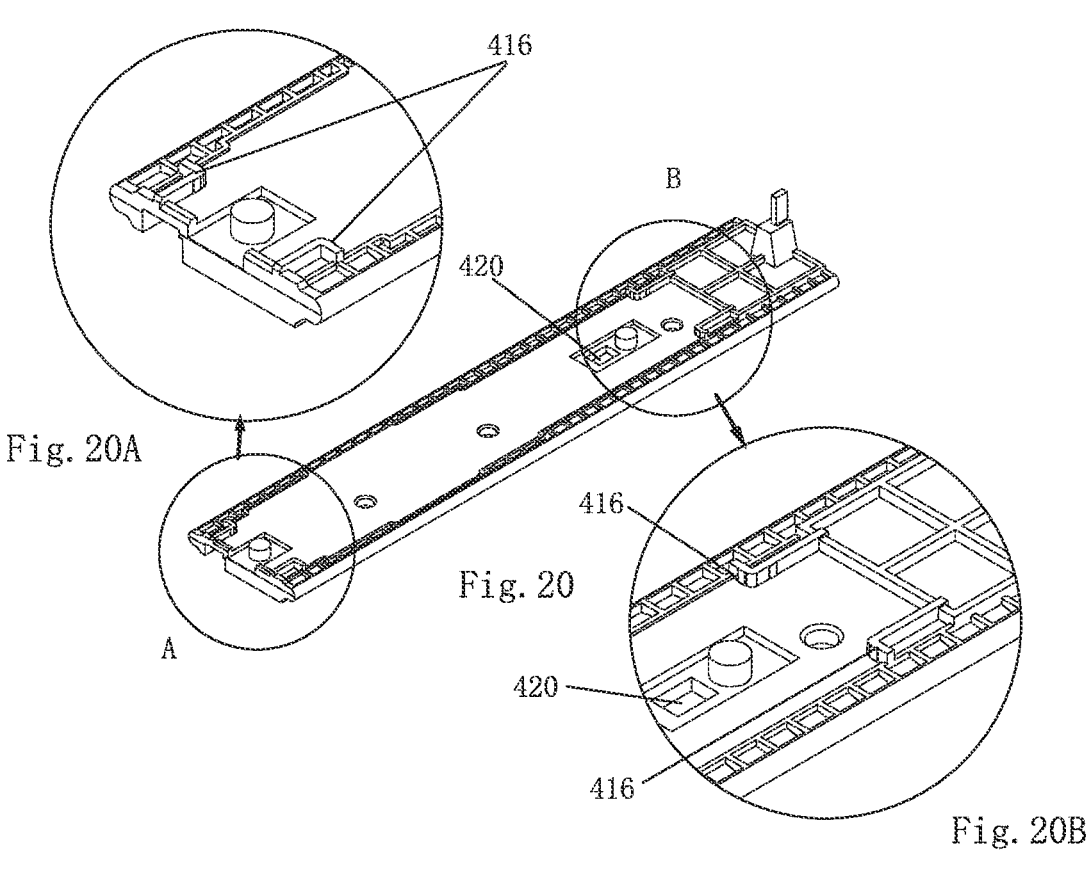
416
B
420
Fig. 20A
A
Fig. 20
416
420
416
Fig. 20B
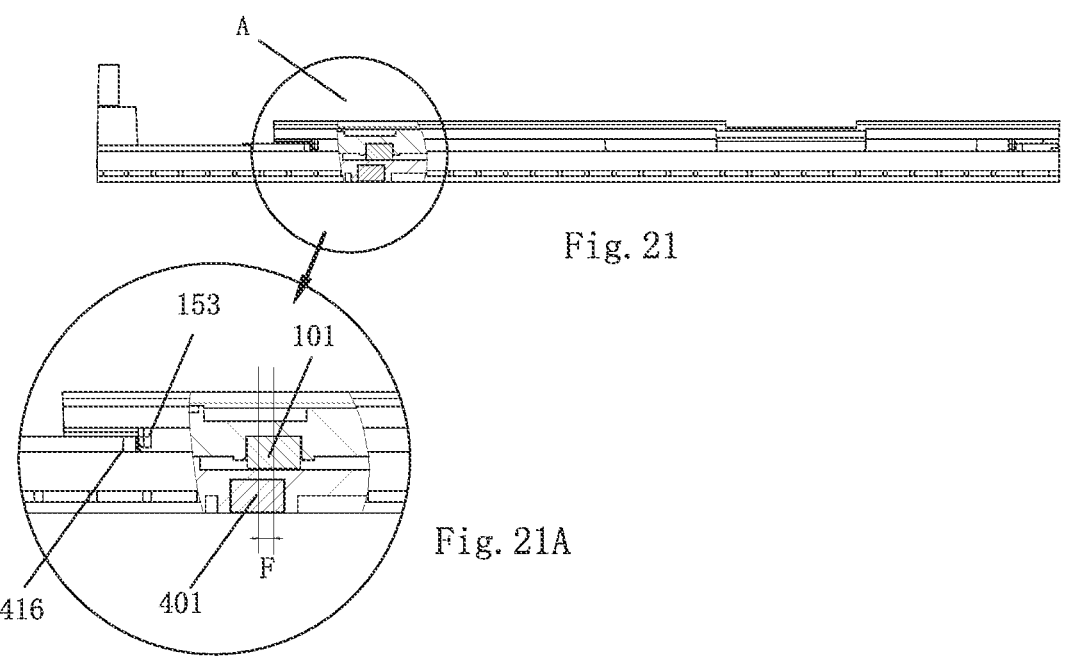
A
Fig. 21
153
101
416
401
F
Fig. 21A

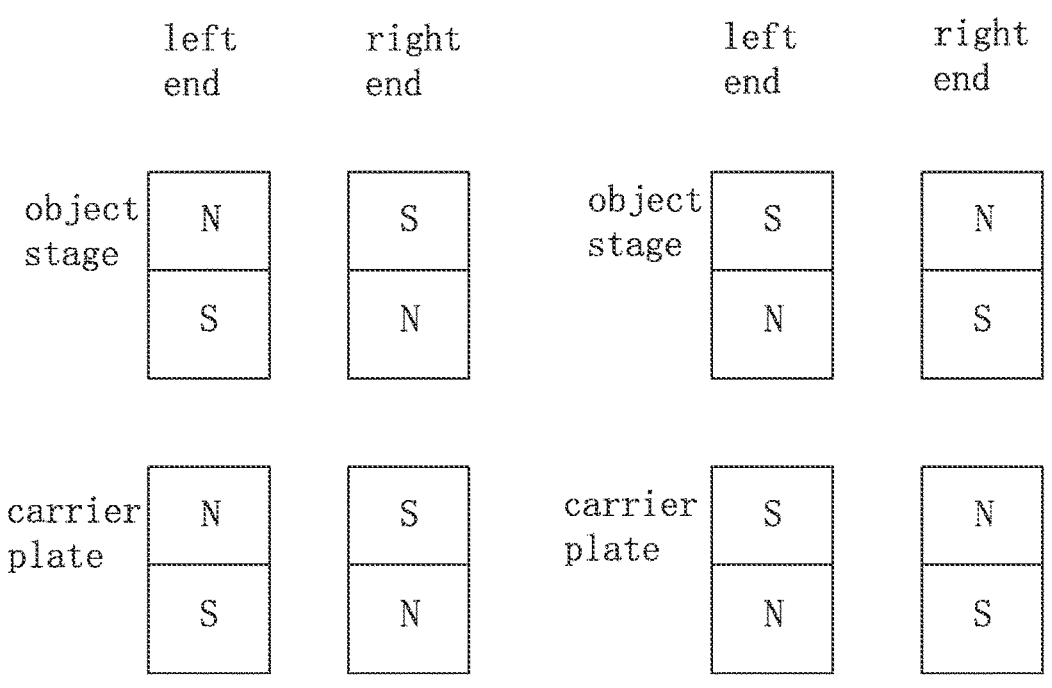
Fig. 22
Fig. 23
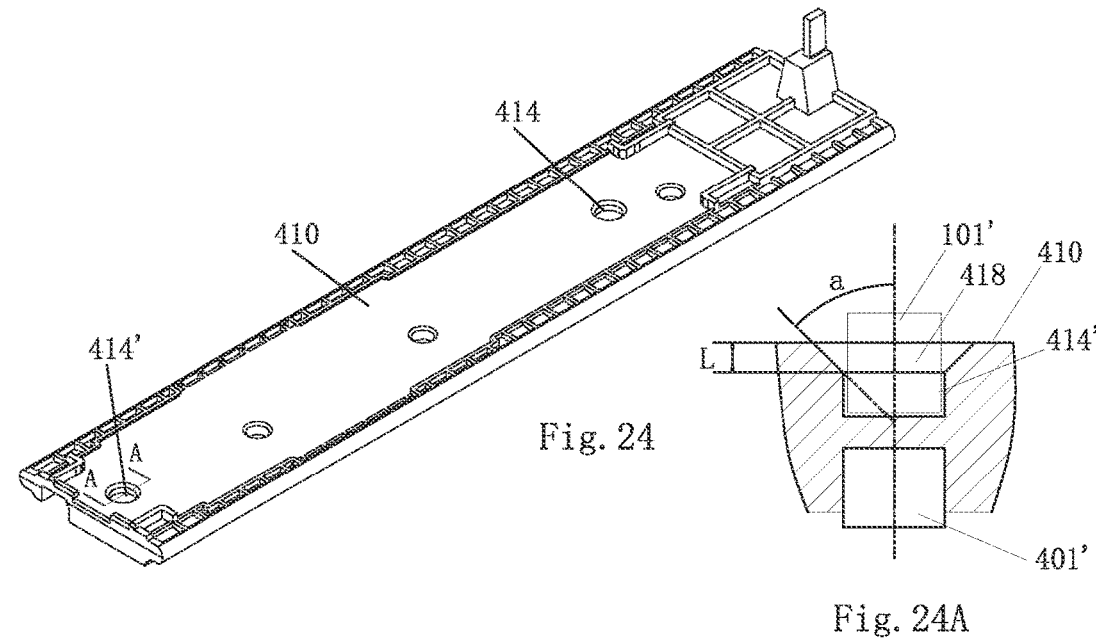
Fig. 24
Fig. 24A

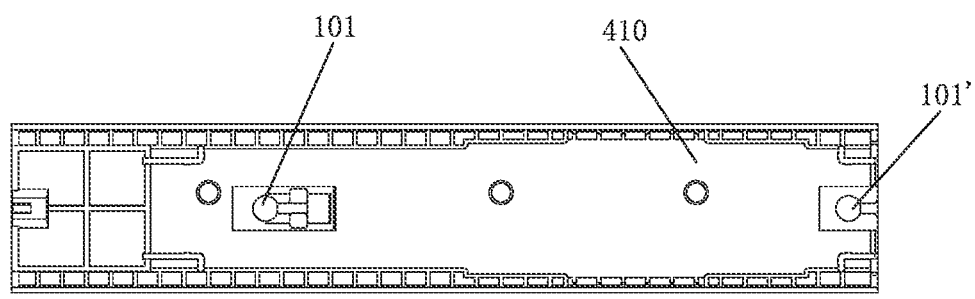
Fig. 30
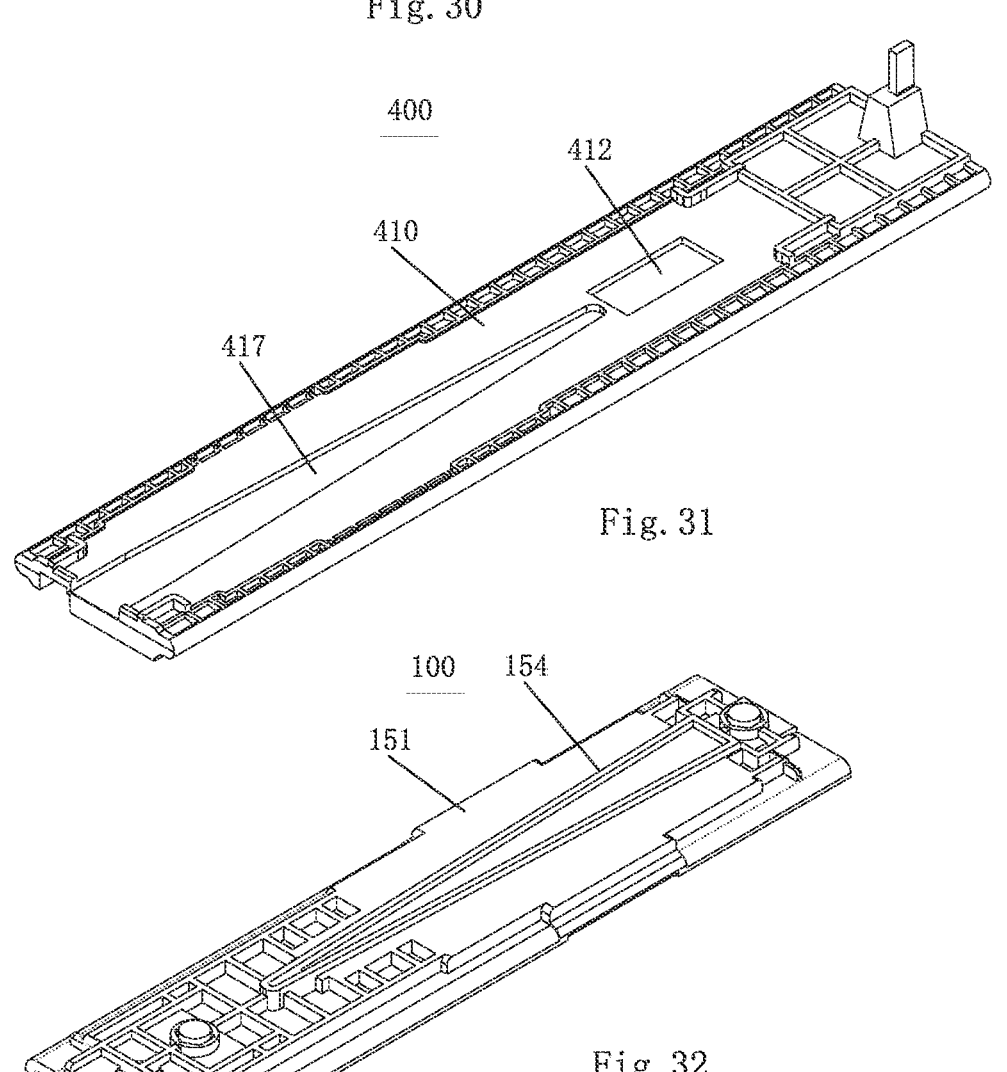
Fig. 31
Fig. 32

417    154
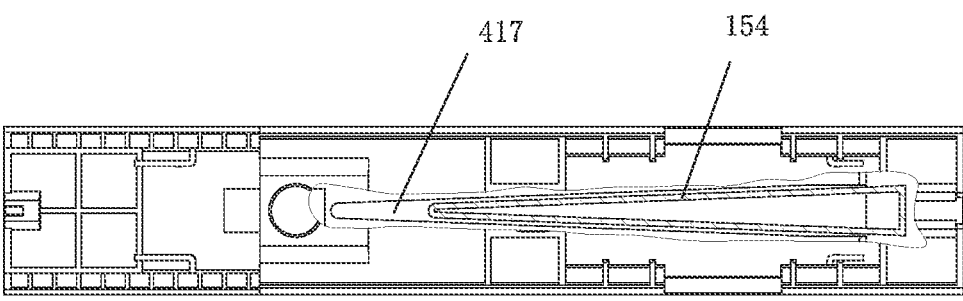
Fig. 33
154
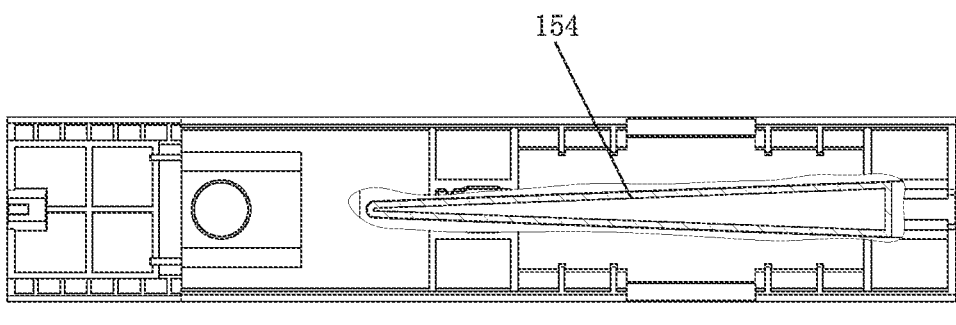
Fig. 34
Fig. 35

417'

154'

OBJECT STAGE AND TRANSFER PLATFORM FOR BIOLOGICAL SAMPLE ANALYZER, AND BIOLOGICAL SAMPLE ANALYZER

CROSS-REFERENCE TO RELATED MATTERS

The present invention is filed under 35 U.S.C. § 371 as the U.S. national phase of International Patent Application No. PCT/CN2021/080953, filed Mar. 16, 2021, which designated the United States and claims priority to Chinese Patent Application No. 202010048939.0, filed Jan. 16, 2020, and to Chinese Patent Application No. 202010592923.6, filed Jun. 25, 2020, and to Chinese Patent Application No. 202021200373.0, filed Jun. 25, 2020, and to Chinese Patent Application No. 202021200379.8, filed on Jun. 25, 2020, each of which is hereby incorporated in its entirety including all tables, figures and claims.

FIELD OF THE INVENTION

The present invention belongs to the field of medical test, and relates to biological sample analyzers and accessories thereof, in particular to an object stage and a transfer platform for a biological sample analyzer and the biological sample analyzer.

BACKGROUND OF THE INVENTION

A urine analyzer, as one type of biological sample analyzer, is used to measure physiological indicators in urine. Generally, a test strip or test card (also referred to as "biological sample detection reagent" or referred to as "detection reagent" for short in the present invention) soaked with urine is placed on an object stage and transported to a detection position to read the detection result by an instrument. There are three implementing solutions at present for an instrument intending to realize use of two test devices, i.e., a test strip and a test card.

The first solution is to place the test strip or the test card on respective corresponding holders, and then place the holders on a common object stage. Like the urine analyzer in U.S. Pat. No. 7,118,713, an operator needs to replace the holder while replacing the test strip or test card with a test card or test strip, which is tedious in operation step and would result in a dead end for cleaning at the placement position where the holder is disposed on the object stage.

The second solution is to provide a test card placement position on the object stage, and process the outline dimension of a test strip holder so that the test strip holder can also be placed in the test card placement position, such as the urine analyzer in U.S. Pat. No. 6,239,445. This solution has one less test card holder compared to the first solution above, but still requires repeated replacement of the holder during use.

The third solution is to design the object stage on two sides, one side being the test strip placement position and the other side being the test card placement position. Such object stage usually requires to be larger in size and occupy larger space. When replacing test type, the operator needs to clean and dry the used side of the object stage at first, and then connect the used side with an instrument, with the unused side being used for placement of the test card or test strip. Urinary machines with different types of detection devices (test card or test strip) can be placed on front and reverse sides of such object stage, and when the type of detection device is replaced, the object stage needs to be taken down, cleaned, and then placed into the instrument, which indicates complicated operation steps.

The existing design of the object stage has problems such as large size of the instrument, many operating steps, difficulty in cleaning, and inconvenience in use and so on.

In addition, after the test card is placed on the object stage, it is necessary to ensure that the test card can be precisely positioned within a detection instrument so that the optical detection component of the instrument can be precisely aligned with the detection area of the test card to obtain an accurate test result. If the test card is inaccurately positioned within the detection instrument, an active light source emitted from the optical detection component on the detection instrument will not be able to precisely illuminate the detection area, resulting in inaccurate detection results or error reporting. Although some prior arts can perform accurate positioning, the positioning process is tedious, time-consuming and inefficient. Therefore, there is a need for a biological sample analyzer with an object stage, which is both accurate in positioning and easy and fast to operate.

SUMMARY OF THE INVENTION

The present invention provides an object stage for a biological sample analyzer, which plays a role in transferring a detection device in the biological sample analyzer, and can achieve selection of placing a test strip or a test card (also referred to as a detection plate) on the same side of the same object stage without turning over the object stage, so as to complete items using the test strip for detection or items using the test card for detection, respectively. Meanwhile, a detection plate and a test strip for mated use with the object stage are also provided. It simplifies the detection steps, improves the detection efficiency, and reduces the risk of erroneous detection.

The object stage for the biological sample analyzer provided by the present invention is provided with a detection device limiting structure on its side carrying the detection device.

The side of the object stage carrying the test strip is provided with a detection plate limiting structure, which can fix the detection plate to the object stage and ensure the accurate placement direction of the detection plate.

In some preferred embodiments, the detection plate limiting structure is a boss(es) that fit(s) the detection plate, or a recessed hole(s) that fit(s) the detection plate, or a groove that accommodates the detection plate, or a combination of the boss(es) and the groove, or a combination of the recessed hole(s) and the groove.

When the detection plate limiting structure is a boss, in addition to mating with the detection plate to limit the detection plate on the object stage, the boss also limits the position of the test strip on the object stage to ensure that the detection result area on the detection plate or test strip is exactly in a light source detection area of the biological sample analyzer, thus ensuring that the detection result can be accurately read by the biological sample analyzer. Meanwhile, the boss also has the function of supporting the test strip, especially the test strip soaked with a sample, which is likely to deform due to increased weight to result in deformation of the detection result area, resulting in that the detection result can not be collected accurately. Therefore, it is especially important that the test strip is supported. When the detection plate limiting structure is a recessed hole, in addition to mating with the detection plate to limit the detection plate on the object stage, the recessed hole also limits the test strip on the object stage, so that both the detection plate and the test strip are located in an appropriate light source detection area. When the detection plate limiting structure is a groove accommodating the detection plate, the detection plate is limited by the groove, so that the detection plate is located within the appropriate light source detection area.

In some preferred embodiments, the height of the boss ensures that the detection height of the test strip located on the boss is the same as the detection height of the test strip located inside the detection plate on the boss. In this way, both the detection result of the detection plate and the detection result of the test strip can be located in the appropriate light source detection area of the biological sample analyzer, thereby ensuring that the detection results on the detection plate and the test strip can be accurately read by the biological sample analyzer.

In some preferred embodiments, uneven arrangement of the bosses or recessed holes on the object stage plays a dull-proofing role.

Such uneven arrangement way can be used to identify the direction of the detection plate placed on the object stage. The uneven arrangement way of the bosses is selected from, but not limited to, the following ways or a combination thereof, for example, the bosses are not arranged in the same straight line; the spacings between the bosses are different; the spacings from the bosses to the end of the groove are different; and the distances from the bosses to the end of the groove are different from the spacings between the bosses.

In some preferred embodiments, the number of the boss or the recessed hole is one or more. More preferably, it is three or more, for example.

In some preferred embodiments, the boss or the recessed hole is located in the groove. It either can accommodate and define the detection plate through the groove, or can further limit the position of the detection plate by the boss.

In some preferred embodiments, there are three bosses, which are located in the groove and unevenly arranged. Specifically, the three bosses are unevenly arranged with different spacings.

In some preferred embodiments, the object stage is also provided with a test strip positioning structure.

In some preferred embodiments, the test strip positioning structure is clamping slots or pins located at two ends of the object stage, or a combination of the clamping slots and the pins.

In some preferred embodiments, the clamping slots located at the two ends of the object stage are a first clamping slot and a second clamping slot. The two pins are located in the first clamping slot and the second clamping slot respectively.

In some preferred embodiments, the center of the boss is located in the same straight line as the center of the first clamping slot and the center of the second clamping slot. The first clamping slot and the second clamping slot are used to place and fix the test strip to play a role in positioning the test strip. The center of the boss is located in the same straight line as the center of the first clamping slot and the center of the second clamping slot, so that the boss becomes the bottom support of the test strip.

In some preferred embodiments, the first clamping slot and the second clamping slot are located at the two ends of the groove accommodating the detection plate.

In some preferred embodiments, the three bosses located in the groove are distributed in a straight line, and the centerline of the bosses coincides with the centerline of the first clamping slot and the second clamping slot.

In some preferred embodiments, because the thickness of the detection plate is usually greater than the thickness of the test strip, the depth of the groove accommodating the detection plate is greater than the depths of the first clamping slot and the second clamping slot for placement of the test strip, so as to ensure that the detection result of the detection plate is at the same height as the detection result of the test strip.

Similarly, in order to ensure that the detection result area of the detection plate is at the same height as the detection result area of the test strip, in some preferred embodiments, the first clamping slot and the second clamping slot are both provided with a bump therein to support the test strip, the height of the bump being the same as the height of the boss.

In some preferred embodiments, the first clamping slot and the second clamping slot have the same width as the test strip to better fix the test strip.

In some preferred embodiments, to better define the test strip, the first clamping slot is open at both ends, and the opening has the same width as the test strip; the second clamping slot is open at one end, and symmetrical bulges are disposed at the opening; both two side walls at the tail end of the second clamping slot are provided with symmetrical bulges; and the spacing between the bulge at the opening and the bulge on the side wall of the second clamping slot is the same as the width of the test strip.

In some preferred embodiments, in order to better fix the detection plate located in the groove, two side walls of the groove are provided with ribs protruding from the side walls; the ribs are adjacent to the end of the groove; and the spacing between the ribs on the two side walls is equal to the width of the detection plate.

The present invention further provides a detection plate for performing detection in a biological sample analyzer, the detection plate having a structure that is mated with the structure of the object stage. Specifically, the detection plate comprises a bottom plate and a cover plate, and the back side of the bottom plate is provided with a limiting structure mated with the detection plate limiting structure on the object stage.

In some preferred embodiments, the limiting structure on the back side of the bottom plate is a recessed hole or a bulge.

Specifically, there are one or more recessed holes or bulges. When the limiting structure on the back side of the bottom plate is the recessed hole, the recessed hole corresponds to the boss on the object stage, and the sizes, shapes and positions of the two are all in one-to-one correspondence. When the detection plate is placed on the object stage, the recessed hole in the detection plate will snap into the boss of the object stage in one-to-one correspondence, thus realizing the fixation of the detection plate and the determination of the direction of the detection plate. Similarly, when the limiting structure on the back side of the bottom plate is bulge, recessed holes are correspondingly disposed on the object stage, which likewise enables the fixation of the detection plate and the determination of the direction of the detection plate.

In some preferred embodiments, there are three or more recessed holes or bulges on the detection plate, which are unevenly arranged. The uneven arrangement way of the recessed holes or bulges on the detection plate also corresponds to the uneven arrangement way of the bosses or recessed holes on the object stage.

In some preferred embodiments, the recessed holes or the bulges are located on the centerline of the bottom plate.

In some preferred embodiments, the detection plate is provided with symmetrical depressions at the middle positions of the two side walls of the bottom plate and the cover plate.

The present invention further provides a detection unit of a biological sample analyzer, comprising a motion mechanism and an optical detection system, and the object stage as described in the present invention and an object stage transfer platform.

In some preferred embodiments, the object stage transfer platform is a rack plate, on which the object stage is removably mounted.

The present invention further provides a biological sample analyzer comprising a detection unit, the detection unit comprising a motion mechanism and an optical detection system, and the object stage as described in the present invention and an object stage transfer platform.

The present invention provides a transfer platform for a biological sample analyzer, comprising a movable carrier plate and an object stage which is placed on the carrier plate and separable from the carrier plate; the side of the carrier plate facing the object stage is an upper surface, and the reverse side is a lower surface; the side of the object stage facing the carrier plate is a lower surface, and the reverse side is an upper surface; the object stage and the carrier plate are respectively provided with magnetic blocks that magnetically attract each other, and when the object stage is placed in the predetermined area on the carrier plate, the suction of the magnetic blocks automatically positions the object stage relative to the carrier plate.

Further, the transfer platform for the analyzer comprises two pairs of magnetic blocks spaced at an appropriate distance from each other, the two magnetic blocks on the object stage having opposite polarities in the same direction, the two magnetic blocks on the carrier plate having opposite polarities in the same direction, and the magnetic blocks on the object stage and the corresponding magnetic blocks on the carrier plate being arranged in a manner that opposites attract each other.

Further, the upper surface of the carrier plate is provided with a depressed area in an area close to the magnetic block; and when the orthographic projection of the magnetic block on the object stage on the carrier plate is located in the depressed area, the suction of the magnetic block automatically positions the object stage relative to the carrier plate.

Further, the upper surface of the carrier plate is provided with a depressed area in the area directly above the magnetic block thereof, and when the object stage is placed on the carrier plate, the magnetic block on the object stage is located in the depressed area. Further, the outline of the depressed area on the carrier plate is rectangular, square, round or oval, its area is larger than that of the bottom surface of the magnetic block mounted on the object stage, and the magnetic block on the object stage is cylindrical, and has a movement space in the depressed area.

Further, the magnetic block on the object stage at least partially protrudes from the lower surface of the object stage and enters the depressed area on the carrier plate. Further, the upper surface of the carrier plate and the lower surface of the object stage are provided with vertical walls that fit each other, respectively, and when the object stage is placed in the predetermined area on the carrier plate, the suction of the magnetic block causes the vertical walls on the object stage and the carrier plate to rest against each other.

Further, the axes of the magnetic blocks on the carrier plate and the object stage deviate from each other by 0.5 to 3.0 mm.

Further, the magnetic block on the object stage at least partially protrudes from the lower surface of the object stage, the carrier plate is provided with a counter bored hole on the upper surface thereof, and the protruding magnetic block on the object stage falls into the counter bored hole on the carrier plate and rests against the wall of the counter bored hole, thereby achieving automatic positioning.

Further, the upper surface of the carrier plate is provided with a ramp channel communicated with the counter bored hole, the ramp channel gradually descending from a position farther from the counter bored hole to a position closer to the counter bored hole. Further, the uppermost opening of the counter bored hole is provided with a guide hole for cone chamfer having a larger size, the depth of the chamfer being 0.3 to 2.0 mm, and the angle between the chamfer and the vertical axis of the counter bored hole being between 30 degrees and 60 degrees.

Further, the upper surface of the carrier plate is provided with a depressed area in the area directly above the magnetic block thereof, and the counter bored hole is located in this depressed area.

Further, the diameter of the counter bored hole is 0.1 to 1.0 mm larger than the diameter of the magnetic block.

Further, the upper surface of the carrier plate and the lower surface of the object stage are provided with positioning structures that fit each other, respectively.

Further, the positioning structure comprises bulges disposed on the upper surface of the carrier plate and the lower surface of the object stage, respectively, and the suction of the magnetic block causes these bulges to rest against each other, thereby achieving automatic positioning.

Further, the positioning structure comprises a bulge and a groove that fit each other, which are disposed on the upper surface of the carrier plate and the lower surface of the object stage respectively, the bulge falls into the groove, and the suction of the magnetic block causes the side walls of the bulge and the groove to rest against each other, thereby achieving automatic positioning.

Further, the orthographic projections of the bulge and the groove, located on the carrier plate and the object stage, on the upper surface of the carrier plate or the lower surface of the object stage have an outer outline of a wedge shape.

Further, the outlines of the bulge and the groove, located on the carrier plate and the object stage, on the cross section of the carrier plate or the object stage are of a wedge shape or inverted trapezoid shape having a wide top and a narrow bottom.

Further, the upper surface of the carrier plate is provided with a drainage channel in the area close to the magnetic block on the carrier plate.

Further, the upper surface of the carrier plate is provided with a drainage hole communicated with the depressed area, the drainage hole penetrating to the lower surface of the carrier plate.

Further, the upper surface of the carrier plate is provided with a drainage channel communicated with the counter bored hole, the drainage trench comprising a drainage hole penetrating to the lower surface of the carrier plate.

Further, the drainage channel is provided with water-absorbing materials selected from: water-absorbing filter paper, sponge, a nitrocellulose membrane and a glass fiber membrane.

Further, the present invention provides a transfer platform on a biological sample analyzer, comprising a movable carrier plate and an object stage which is located on the carrier plate and separable from the carrier plate; the object stage and the carrier plate each comprise an upper surface and a lower surface, the lower surface of the object stage and the upper surface of the carrier plate facing each other; the upper surface of the object stage is provided with a limiting structure for fixing a detection element, and the object stage and the carrier plate are respectively provided with a magnetic block, the magnetic blocks of the two being arranged in a magnetic attraction manner; and when the object stage is placed in a predetermined area on the carrier plate, the magnetic blocks on the object stage and the plate magnetically attracted are close to each other, so that the object stage automatically moves to a specified position on the carrier plate. Further, the object stage on the transfer platform described in the present invention may further comprise the limiting structure described in the present invention.

The present invention further provides a biological sample analyzer, comprising a motion mechanism, an optical detection mechanism, and a transfer platform for the biological sample analyzer described in the present invention that is driven by the motion mechanism.

Beneficial Effects

The structure of the object stage of the present invention can carry both the test strip and the detection plate to implement detection without moving the object stage, especially without turning over the object stage. Meanwhile, if the limiting structure on the object stage is the boss, when the test strip is selected for detection, the boss plays a role in supporting and limiting the test strip; when the detection plate is selected for detection, the boss plays a role in positioning the detection plate; and due to the uneven arrangement of the boss, it can play a limiting role and a dull-proofing role to prevent reverse placement of the detection plate. In addition, the groove of the object stage not only can accommodate and limit the detection plate during detection using the test strip, but also has a large space for urine, which can effectively reduce urine pollution. Meanwhile, the biological sample analyzer with the object stage and the detection unit becomes smaller in size; repeatedly turning over the object stage is avoided in the detection process, and the operating steps are reduced; and at the same time, the object stage is detachably carried on the rack plate driven by a motor, which facilitates access to the biological sample analyzer and disassembly, thereby facilitating cleaning.

As the transfer platform for the analyzer of the present invention adopts magnets arranged in a manner that opposites attract each other, and is also provided with the positioning structure, it is only necessary to put the object stage loaded with a detection reagent to a predetermined approximate position on the carrier plate (without the need of precise positioning) during operation, and then the object stage can automatically reach the precise position on the carrier plate under the driving of magnetic force and the precise guidance of the positioning structure to realize automatic and precise positioning, thereby achieving the technical effect of blind positioning. Therefore, the present invention has the advantages of easy operation, time and effort saving, and high working efficiency and so on. At the same time, the present invention is simple in structure and low in cost, and is suitable for wide promotion.

BRIEF DESCRIPTION OF THE DRAWINGS

FIG. 1 is a structure diagram of an object stage for a biological sample analyzer of the present invention.

FIG. 2 is a top view of the object stage for the biological sample analyzer of the present invention.

FIG. 3 is a schematic diagram that a detection plate is placed on the object stage for the biological sample analyzer of the present invention.

FIG. 4 is an A-A sectional view of FIG. 3.

FIG. 5 is a schematic diagram of the back side of the detection plate.

FIG. 6 is a schematic diagram that a test strip is placed on the object stage for the biological sample analyzer of the present invention.

FIG. 7 is an A-A sectional view of FIG. 6.

FIG. 8 is a schematic diagram of a detection unit of the biological sample analyzer.

Figure 9:
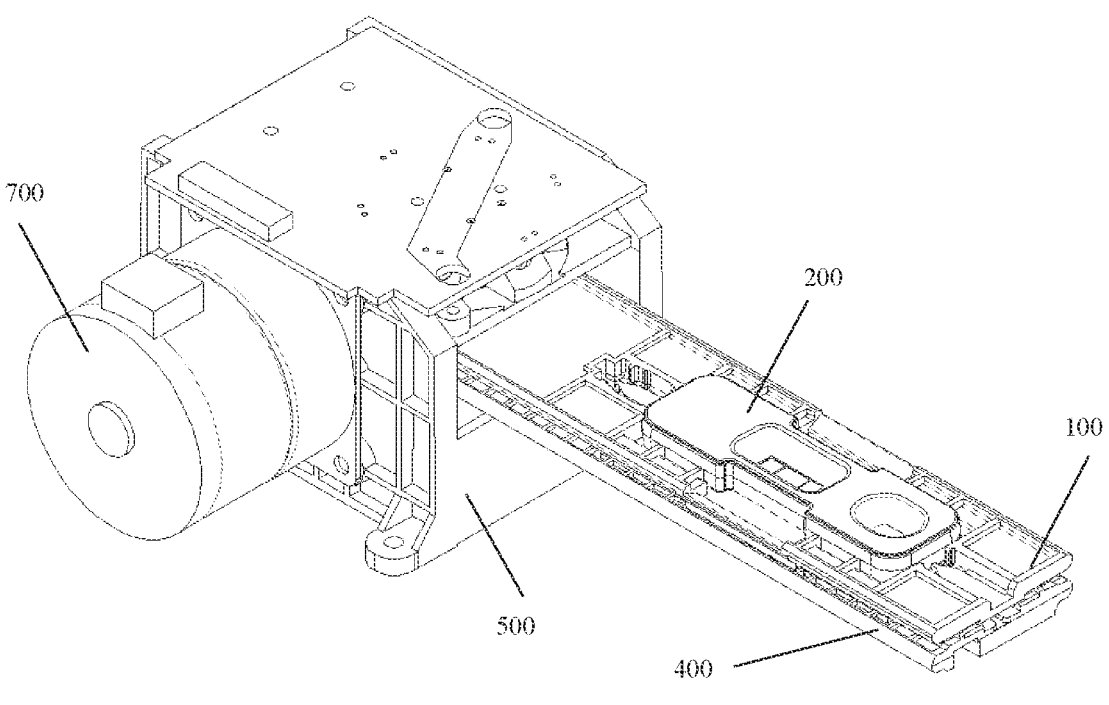

FIG. 9 is a schematic diagram that a detection plate is placed on the detection unit of the biological sample analyzer.

Figure 10:
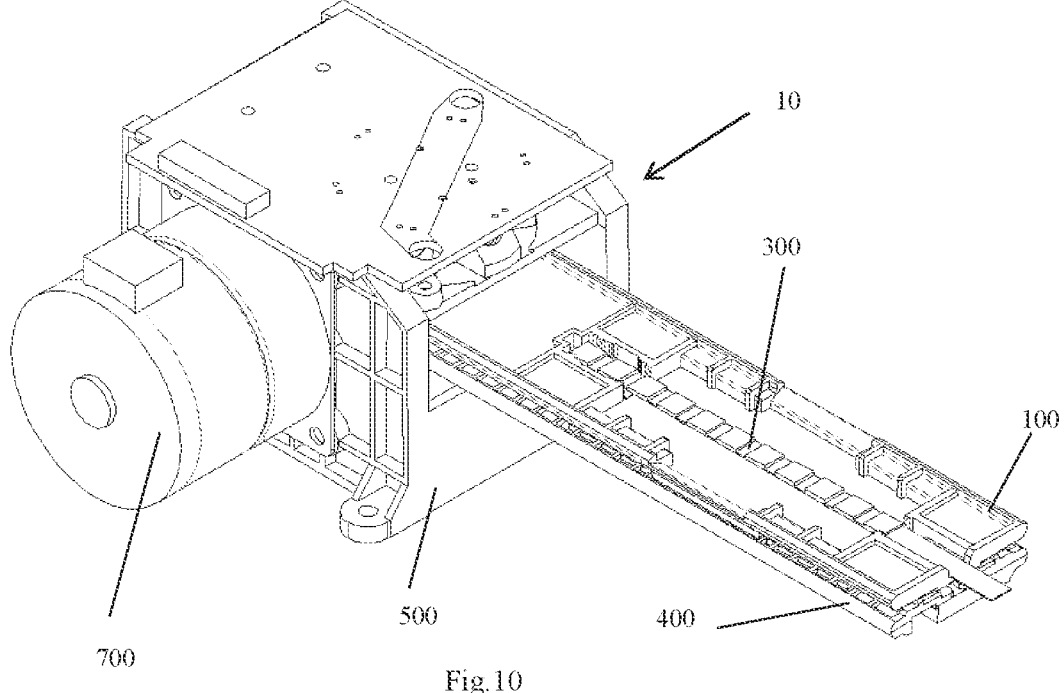

FIG. 10 is a schematic diagram that a test strip is placed on the detection unit of the biological sample analyzer.

Figure 11:
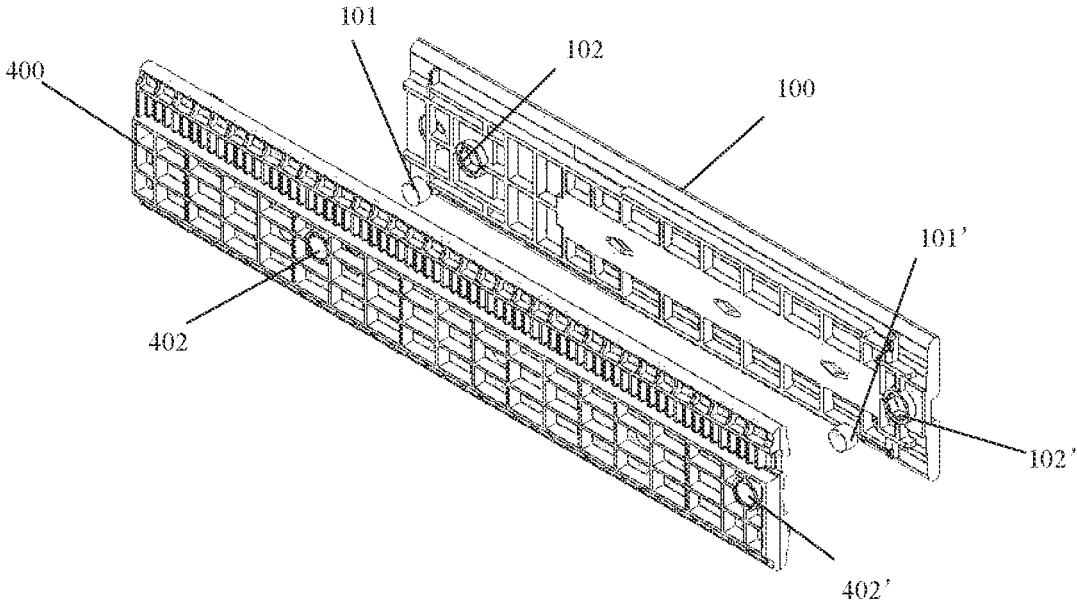

FIG. 11 is an exploded schematic diagram that the object stage fits the carrier plate.

Figure 12:
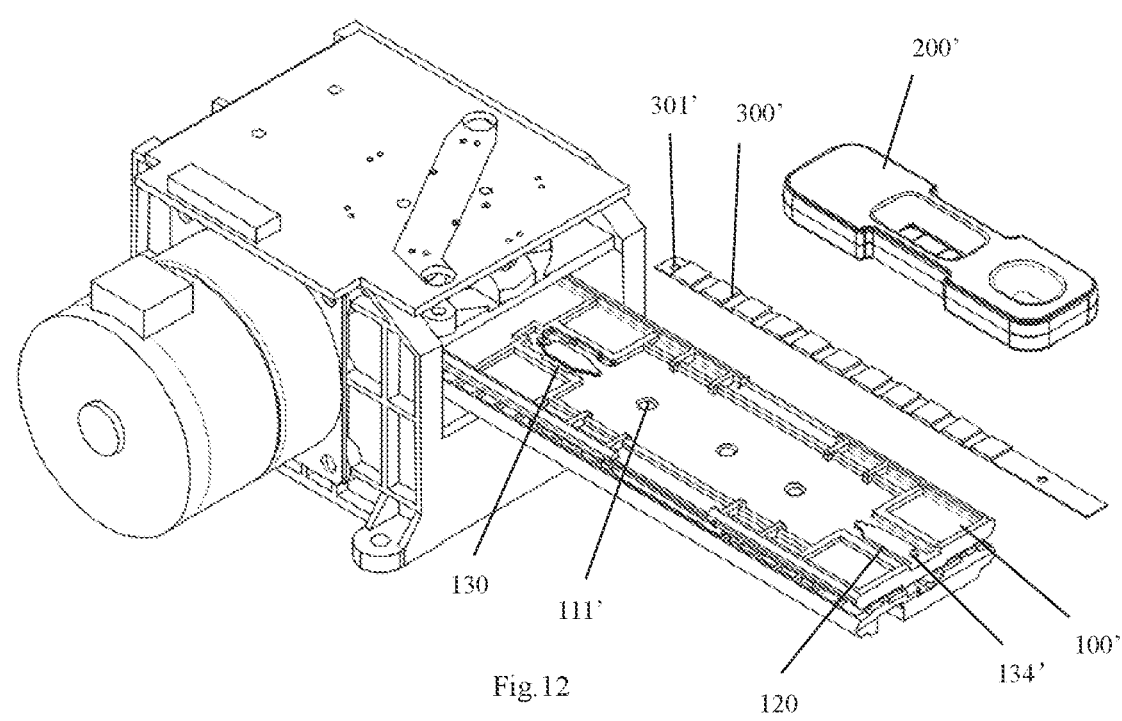

FIG. 12 is a schematic diagram of a detection unit of a biological sample analyzer containing another object stage.

Figure 13:
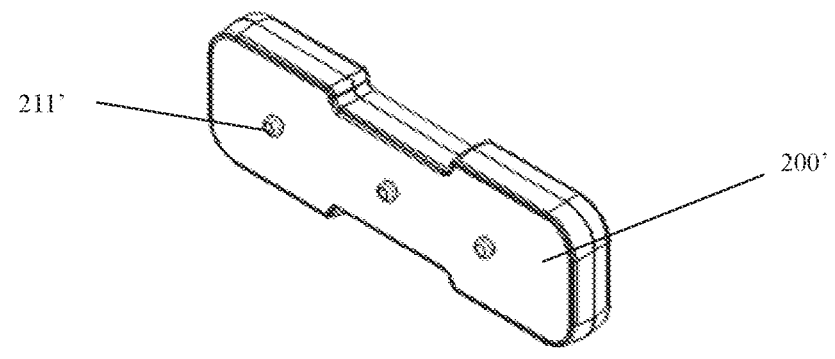

FIG. 13 is a schematic diagram of a detection plate mated with the object stage in FIG. 12.

Figure 14:
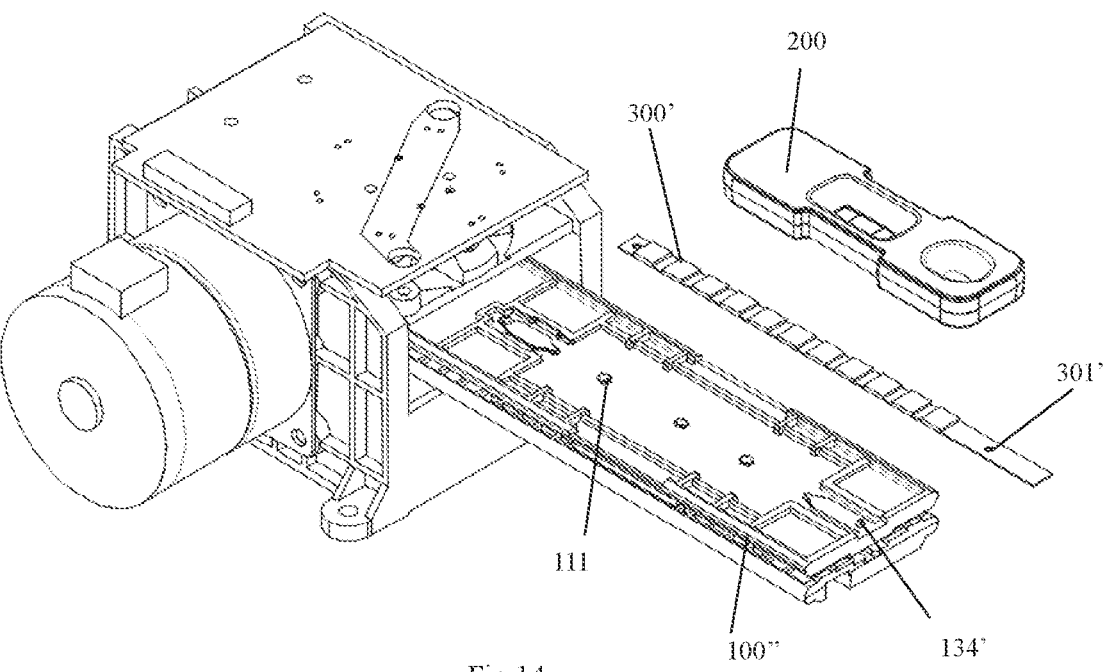

FIG. 14 is a schematic diagram of a detection unit of a biological sample analyzer containing another object stage.

FIG. 15 is a three-dimensional schematic diagram of a carrier plate in the first embodiment of the present invention, showing the upper surface structure of the carrier plate.

FIG. 16 is similar to FIG. 15, but shows magnetic blocks are located in precisely positioned positions.

FIG. 17 is a top view after combination of the carrier plate and the object stage.

Figures 18, 18A, 18B, 19, 19A, 19B:
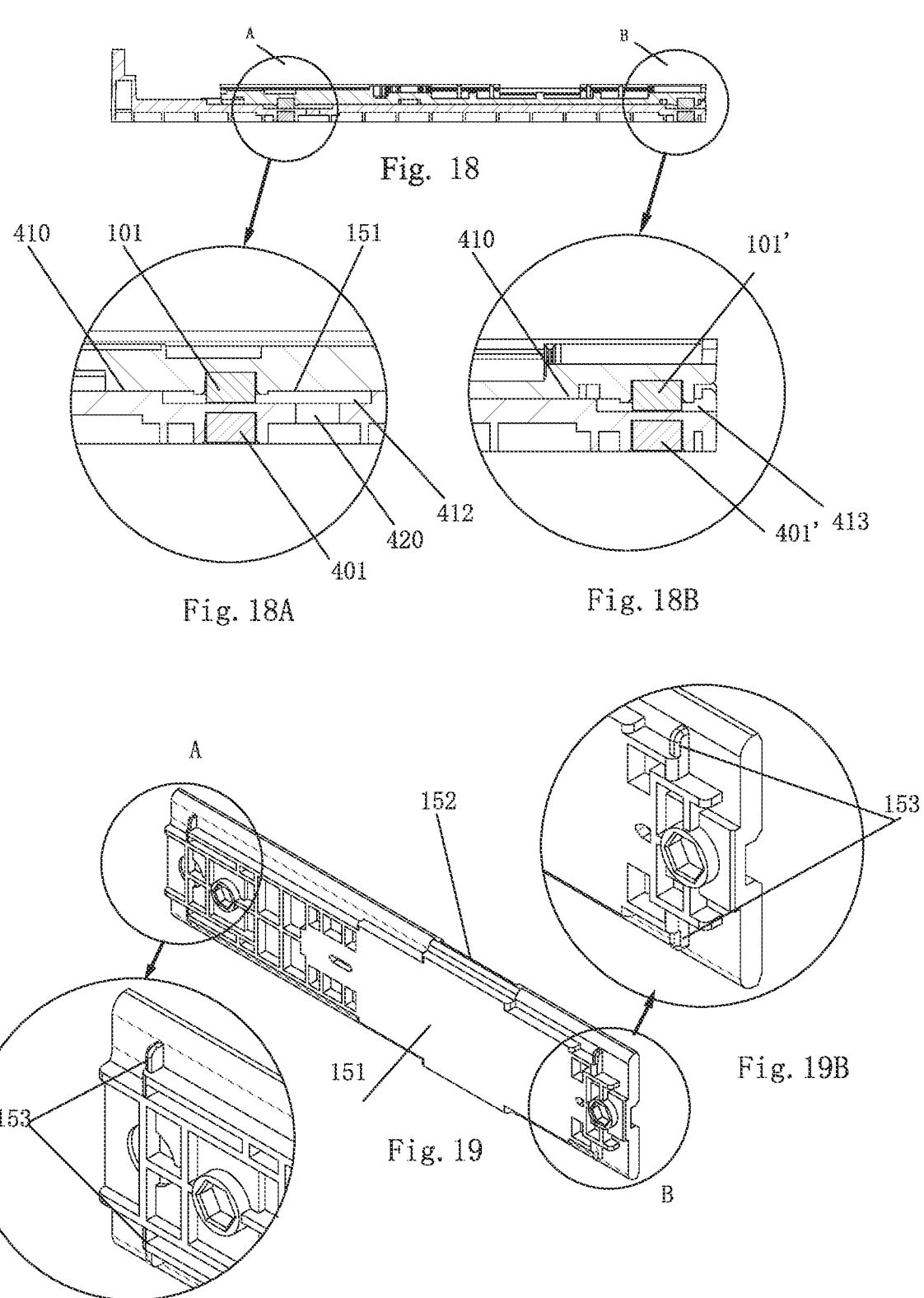

FIG. 18 is a sectional view along line A-A of FIG. 17.

FIG. 18A is a partially enlarged schematic diagram at position A of FIG. 18.

FIG. 18B is a partially enlarged schematic diagram at position B of FIG. 18.

FIG. 19 is a three-dimensional schematic diagram of an object stage in the second embodiment of the present invention, showing the lower surface structure of the carrier plate.

FIG. 19A is a partially enlarged schematic diagram at position A of FIG. 19.

FIG. 19B is a partially enlarged schematic diagram at position B of FIG. 19.

FIG. 20 is a three-dimensional schematic diagram of a carrier plate in the second embodiment of the present invention, showing the upper surface structure (including magnetic blocks) of the carrier plate.

FIG. 20A is a partially enlarged schematic diagram at position A of FIG. 20.

FIG. 20B is a partially enlarged schematic diagram at position B of FIG. 20.

FIG. 21 shows a side partial sectional view after combination of FIG. 19 and FIG. 20, where the object stage arrives at a precisely positioned position on the carrier plate.

FIG. 21A is a partially enlarged schematic diagram at position A of FIG. 21.

FIG. 22 is a schematic diagram of the first arrangement solution of polarities of the magnetic blocks on the object stage and the carrier plate.

FIG. 23 is a schematic diagram of the second arrangement solution of polarities of the magnetic blocks on the object stage and the carrier plate.

FIG. 24 is a three-dimensional schematic diagram of a carrier plate in the third embodiment of the present invention, showing the upper surface structure (without magnetic blocks) of the carrier plate.

FIG. 24A is a partially sectional enlarged schematic diagram along the direction of line A-A of FIG. 24.

Figures 25, 26, 26A, 27, 27A:
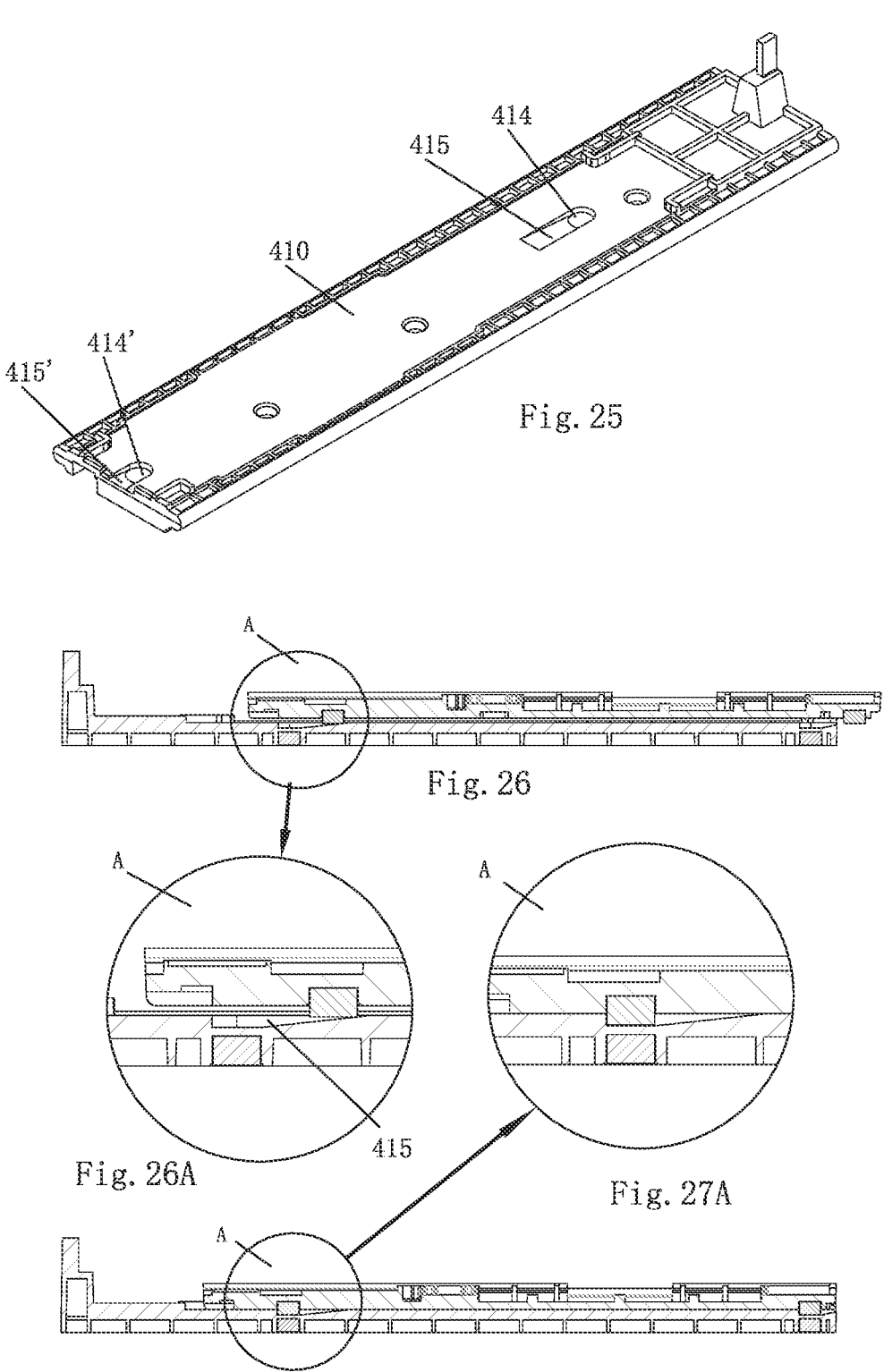

FIG. 25 is a three-dimensional schematic diagram of a carrier plate in the fourth embodiment of the present invention, showing the upper surface structure (without magnetic blocks) of the carrier plate.

FIG. 26 is a side sectional view when the object stage in the fourth embodiment of the present invention is placed into the initial position of the carrier plate.

FIG. 26A is a partially enlarged schematic diagram at position A of FIG. 26.

FIG. 27 is similar to FIG. 26, but shows precisely positioned positions on the carrier plate.

FIG. 27A is a partially enlarged schematic diagram at position A of FIG. 27.

Figures 28, 28A, 28B, 29:
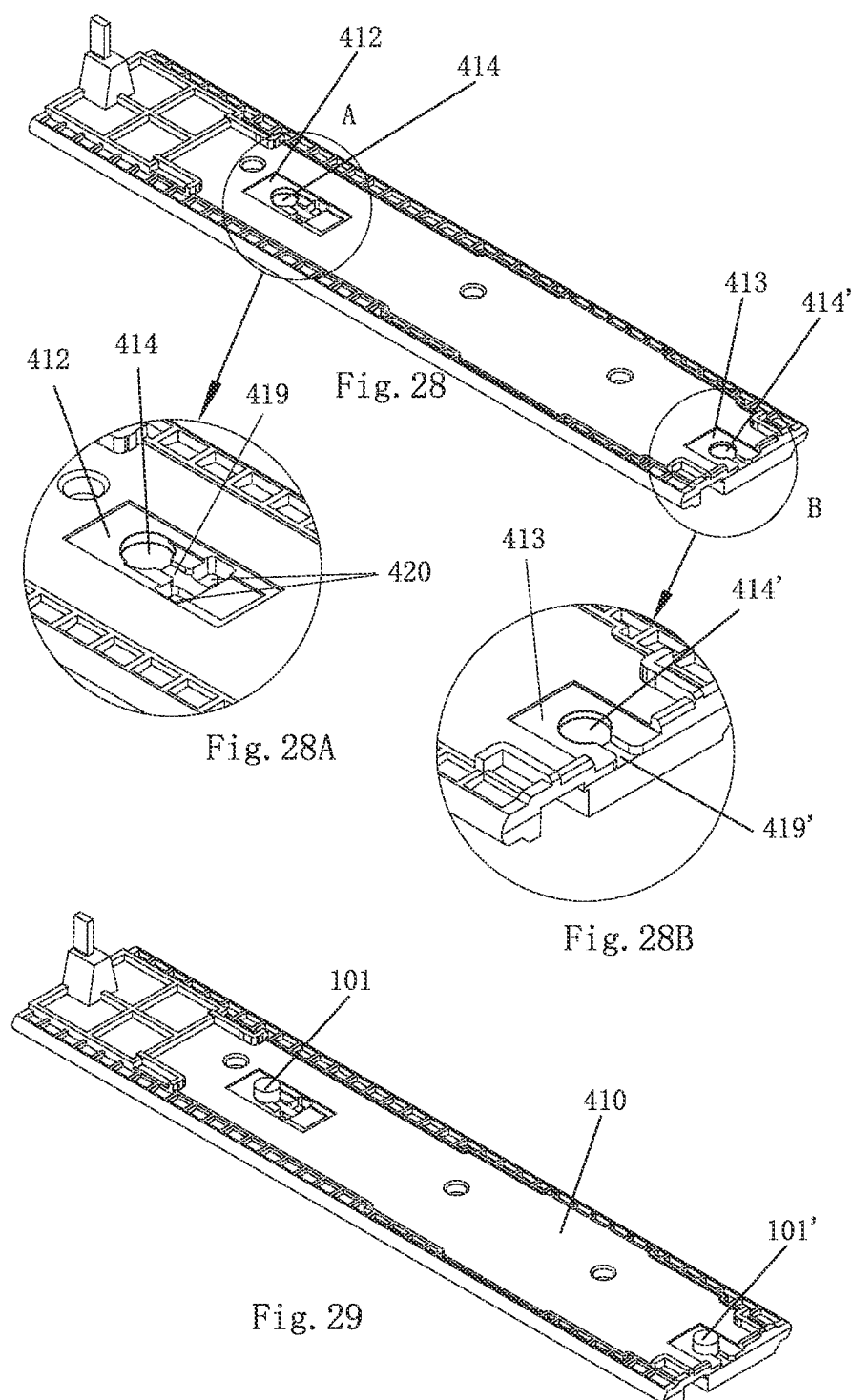

FIG. 28 is a three-dimensional schematic diagram of a carrier plate in the fifth embodiment of the present invention, showing the upper surface structure (without magnetic blocks) of the carrier plate.

FIG. 28A is a partially enlarged schematic diagram at position A of FIG. 28.

FIG. 28B is a partially enlarged schematic diagram at position B of FIG. 28.

FIG. 29 is similar to FIG. 28, but contains magnetic blocks.

FIG. 30 is a planar top view of FIG. 29.

FIG. 31 is a three-dimensional schematic diagram of a carrier plate in the sixth embodiment of the present invention, showing the upper surface structure (without magnetic blocks) of the carrier plate.

FIG. 32 is a three-dimensional schematic diagram of the object stage in the sixth embodiment of the present invention, showing the lower surface structure (containing magnetic blocks) of the carrier plate.

FIG. 33 is a top view (partially sectional) of the initial position after combination of FIG. 31 and FIG. 32.

FIG. 34 is similar to FIG. 33, but shows the object stage arrives at a precisely positioned position on the carrier plate.

FIG. 35 is a side sectional view of FIG. 34.

Figure 36:
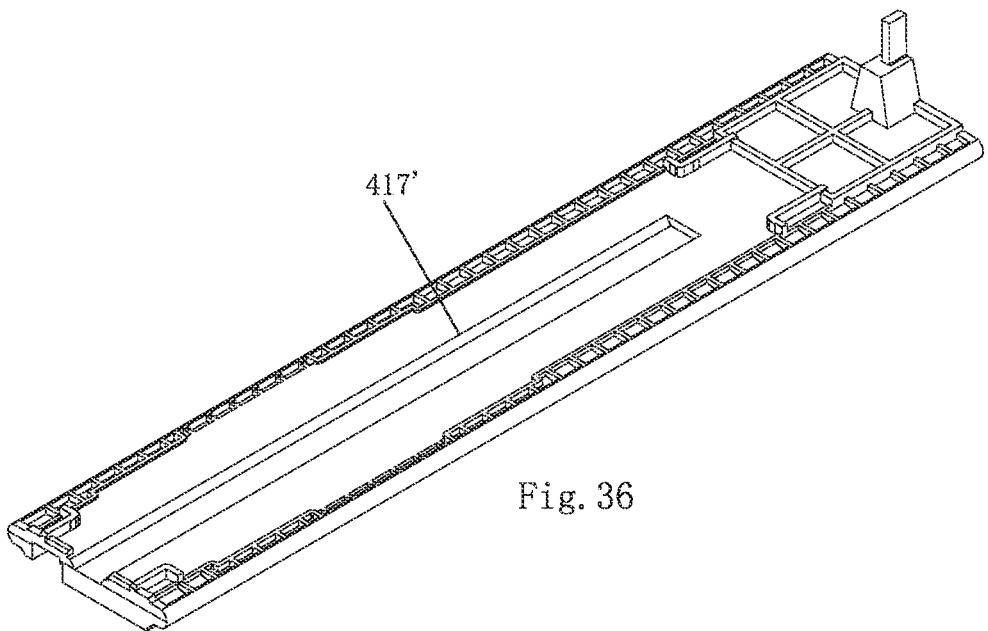

FIG. 36 is a three-dimensional schematic diagram of a carrier plate in the seventh embodiment of the present invention, showing the upper surface structure (without magnetic blocks) of the carrier plate.

Figure 37:
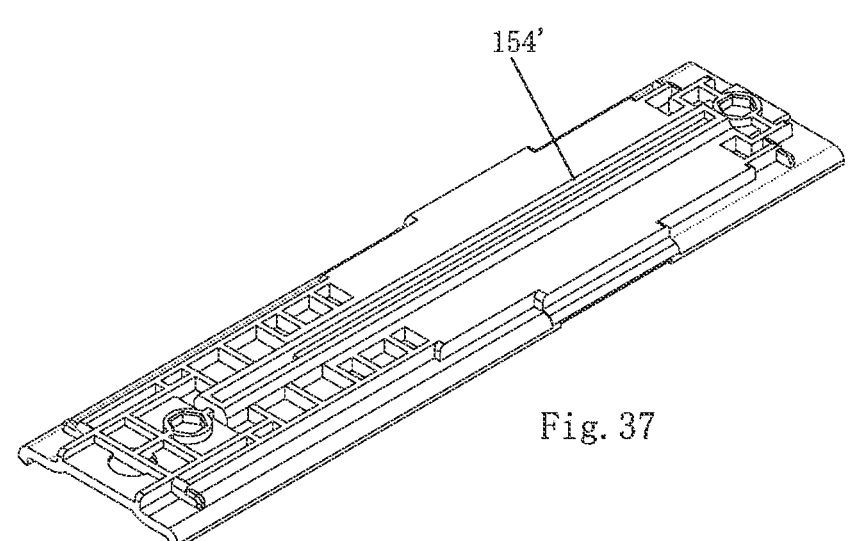

FIG. 37 is a three-dimensional schematic diagram of the object stage in the seventh embodiment of the present invention, showing the lower surface structure (without magnetic blocks) of the carrier plate.

Figure 38:
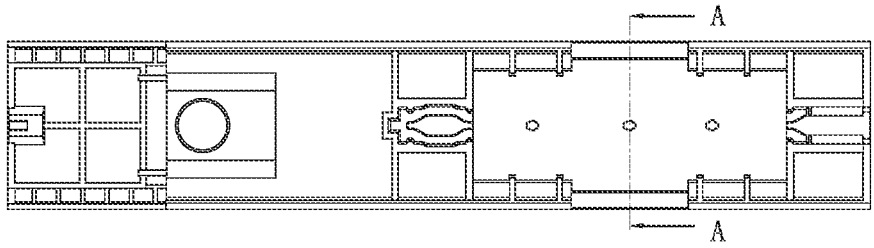

FIG. 38 is a top view after combination of FIG. 37 and FIG. 38.

Figure 39:
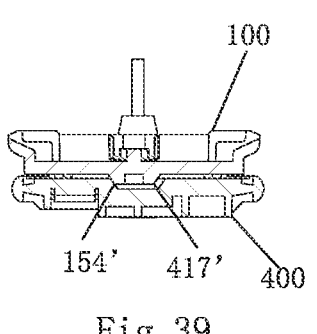

FIG. 39 is a sectional view along line A-A of FIG. 38, showing the initial position after combination of the object stage and the carrier plate.

Figure 40:
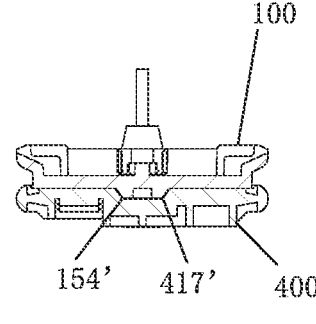

FIG. 40 is similar to FIG. 39, but shows precisely positioned positions after combination of the object stage and the carrier plate.

REFERENCE SIGNS

Object stage 100, 100', 100"; magnetic block 101, 101', 401, 401'; groove 110; boss 111; object stage recessed hole 111'; rib 112; first clamping slot 120; opening 121; bump 122; second clamping slot 130; clamping slot pin 134'; opening 131; bump 132; bulge 133; object stage lower surface 151; object stage upper surface 152; detection plate 200, 200'; bottom plate 210; cover plate 220; recessed hole 211; detection plate bulge 211'; depression 230; test strip 300, 300'; base plate 301; test paper 302; test strip hole 301'; detection unit 10; carrier plate 400; carrier plate upper surface 410; carrier plate lower surface 411; depressed area 412, 413; vertical wall 416, 153; counter bored hole 414, 414'; ramp channel 415; bulge 154; groove 417; guide hole for cone chamfer 418; drainage channel 419, 419'; drainage hole 420; first magnetic hole 102, 402; second magnetic hole 102', 402'; gantry support 500; motor 600; gear 700; hexagonal head 900; detection photoelectric PCB 800.

DETAILED DESCRIPTION OF THE EMBODIMENTS

In the following detailed description, the reference text attached to legends is a part here, which is described by way of exemplifying particularly specific solutions that the present invention may implement. We do not exclude that the present invention can also implement other specific solutions and change the structure of the present invention without departing from the use scope of the present invention.

As shown in FIGS. 1-14, an object stage for a biological sample analyzer of the present invention is capable of achieving placement of both a detection plate and a test strip for detection (which is referred to as a test strip; and for convenience, the detection plate and the test strip for detection are jointly referred to as a detection element) on the same side. An operator selects a detection plate or a test strip respectively according to the needs of a test item, and places the detection plate or the test strip on the object stage to complete the detection and analysis of information on the detection plate or the test strip, so as to avoid frequently taking out the object stage from the biological sample analyzer or turning over the object stage, thereby effectively avoiding erroneous operation of the operator due to cumbersome operations while improving the detection efficiency. Therefore, a detection plate limiting structure is disposed on the same side of the object stage carrying the test strip, such as the front side. This detection plate limiting structure causes the detection plate to be defined at an appropriate position on the object stage, so that after the object stage enters the biological sample analyzer, the detection result on the detection plate is exactly located in a light source detection area. In some embodiments, the detection plate limiting structure is a boss(es) that fit(s) the detection plate, or a recessed hole(s) that fit(s) the detection plate, or a groove that accommodates the detection plate, or a combination of the boss(es) and the groove, or a combination of the recessed hole(s) and the groove.

In the embodiment shown in FIGS. 1 to 10, the object stage 100 is provided with bosses 111. The boss 111 acts as a detection plate limiting structure, and when the detection plate 200 is placed on the object stage, the boss acts as a limiting structure that fits the detection plate to limit the detection plate 200, thus positioning the detection plate in the detection position on the object stage. Meanwhile, when the test strip is located on the object stage, the boss 111 also limits the position of the test strip on the object stage, which can ensure that the detection results on the detection plate and the test strip are exactly in an appropriate light source detection area of the biological sample analyzer, thus ensuring that the detection results on the detection plate and the test strip can be accurately read by the biological sample analyzer. In addition, the boss also serves as a support structure that fits the test strip for supporting the test strip 300, so that the test strip on the object stage is on a substantially identical plane.

In a further optimized design solution, the height of the boss on the object stage is designed to be capable of ensuring that the detection height of the test strip located on the boss is the same as the detection height of the test strip located inside the detection plate on the boss. In this way, no matter the detection plate or the test strip is located on the boss for detection, both of them can be located in an appropriate light source detection area of the biological sample analyzer, which ensures that the detection results of the detection plate and the test strip are accurately read.

The detection plate 200 in the embodiment shown in FIG. 5 includes a bottom plate 210 and a cover plate 220. The test strip for detection is mounted on the bottom plate 210, and the cover plate 220 covers the bottom plate 210 and the test strip to form the detection plate 200. The back side of the bottom plate 210 of the detection plate is provided with a recessed hole 211 corresponding to the boss 111, which is a limiting structure on the detection plate. In an optimized design, the size and position of the recessed hole 211 on the detection plate are in one-to-one correspondence with those of the boss 11 on the object stage. The recessed hole 211 snaps into the boss 111 on the object stage after the detection plate 200 is located on the object stage 100.

There's no limit to the number of the boss 111, as long as the fitting with the recessed hole on the detection plate enables the detection plate to be placed at a correct detection position on the object stage. The number of the boss 111 may be one or more. Specifically, the number of the boss(es) 111 is 1 to 5; and in a specific embodiment, the number of the bosses 111 is 3. The number of the recessed hole 211 on the detection plate may be the same as or different from the number of the boss 111 on the object stage. The number of the recessed holes 211 is the same as the number of the bosses 111, for example, when the number of the bosses 111 is three, the number of the recessed holes 211 is also three. When the number of the recessed holes 211 is different from that of the bosses 111, for example, when the number of the bosses 111 is three, the number of the recessed holes 211 is four, wherein three of the recessed holes correspond to the bosses, and the remaining one can be used for other purposes or be idle when fitting this object stage.

The bosses on the object stage can be evenly distributed and arranged. In another optimized embodiment, the direction of the detection plate 200 on the object stage 100 is identified and defined through uneven arrangement of the bosses 111, which ensures that the direction of the detection plate 200 placed on the object stage 100 will not be wrong. This avoids inaccurate detection results or failure of detection of the detection results resulted from reverse placement of the direction of the detection plate 200 or deviation of the detection plate from the light source detection area of the biological sample analyzer. In an example that the bosses 111 are unevenly arranged on the object stage 100, the specific ways include but are not not limited to that the bosses 111 are not arranged in the same straight line, or, the spacings between the bosses 111 are different. For example, when there are two bosses 111, the line connecting the centers of the two bosses is not parallel to the horizontal central axis or the vertical central axis of the detection plate; further, for example, when there are three and more bosses 111, the spacing between two adjacent bosses 111 is not the same; or the three and more bosses 111 are not disposed in a straight line.

The recessed holes 211 are arranged on the back side of the bottom plate 210 of the detection plate in the same manner as the bosses 111 are arranged on the object stage 100. For example, when the bosses 111 are arranged in a straight line with different spacings, correspondingly, the recessed holes 211 are arranged in a straight line with different spacings, and the spacings of the recessed holes 211 are in one-to-one correspondence with the spacings of the bosses 111. When the bosses 111 are located on the centerline of the object stage 100, the recessed holes 211 are arranged on the centerline of the bottom plate 210.

The recessed holes 211 are on the back side of the bottom plate 210 and can penetrate through or not penetrate through the whole bottom plate 210. When the bosses on the object stage are assembled together with the recessed holes on the detection plate, the bosses will not affect the detection of the test strip in the detection plate.

In the embodiment shown in FIGS. 1-10, the area on the object stage 100 where the detection plate is stored is provided with a groove 110, the groove 110 on the object stage being used to accommodate and limit the detection plate, and the bosses 111 being within the groove 110 in some embodiments. That is, the bosses are combined with the groove to limit the detection plate. In addition, since the groove forms a large space for holding urine, it can accommodate urine spilled from the test strip 300 or the detection plate 200. On the one hand, the urine collected in the groove will not flow out of the object stage to cause pollution to the environment; and on the other hand, because the bottom of the groove has a certain distance from the test strip or detection plate placed on the bosses, the overflowing urine collected at the bottom of the groove cannot contact the test strip or detection plate, thus preventing different urine samples from contaminating the test strip or detection plate under test. In a further optimized design, two side walls of the groove 110 are provided with ribs 112 protruding from the side walls; the ribs 112 are positioned adjacent to the ends of the groove 110; and the spacing between the ribs 112 on the two side walls is equal to the width of the detection plate 200. The detection plate 200 is better fixed within the groove 110 through contact clamping of the ribs 112 on the two side walls and the side walls of the detection plate 200. Two side walls adjacent the two ends of the groove 110 are each provided with one or more ribs 112. The ribs 112 on the two side walls of the groove 110 are symmetrical in position.

In order to take the detection plate 200 on the object stage 100 more conveniently, especially from the groove, depressed portions 230, such as depressed portions 230 symmetrically designed, are disposed at middle positions of the two side walls of the bottom plate 210 and the cover plate 220 of the detection plate. When the detection plate is taken out from the groove, the space formed by the depressed portions can facilitate stretching into the depressed portions by the fingers of an operator or the gripper of a robot arm to grasp the detection plate.

In the embodiment shown in FIGS. 12-13, the detection plate limiting structure on the object stage is recessed holes 111', which are disposed and arranged with reference to the setting and arrangement of the aforementioned bosses 111. Correspondingly, the back side of the bottom plate of the detection plate 200' is provided with detection plate bulges 211' that fit the object stage recessed holes 111', the number and arrangement way of the detection plate bulges 211' being in one-to-one correspondence with those of the object stage recessed holes 111'. When the detection plate 200' is located on the object stage 100', the detection plate bulges 211' on the detection plate 200' are inserted into the object stage recessed holes 111' on the object stage 100' in one-to-one correspondence, so that the detection plate 200' is defined on the object stage 100'.

The limiting structure is the bosses or the recessed holes, of which the cross sections may have different shapes. For example, when there are three bosses, two of the bosses can be square and the third one has a round shape. Correspondingly, the recessed holes on the detection plate that fit the bosses are also square and round, respectively.

The test strip 300 in the embodiment as shown in FIG. 8 includes a base plate 301, to which test paper 302 is affixed. The test paper may be urine test paper, lateral flow test paper, etc.

The object stage is provided with a test strip positioning structure. For example, a test strip positioning structure for positioning on the object stage is clamping slots or pins. When the test strip positioning structure is the pins, the test strip is provided with test strip holes mated with this structure. The test strip is clamped and positioned by the clamping slots, or the test strip holes fit the pins on the object stage to position the test strip.

In the embodiments as shown in FIGS. 1-10, the test strip positioning structure on the object stage 100 is clamping slots, and there are two clamping slots, i.e., a first clamping slot 120 and a second clamping slot 130, corresponding to the two ends of the test strip. The first clamping slot 120 and the second clamping slot 130 are disposed at the two ends of the groove 110 respectively, to position and support the test strip 300. In some specific structures, the first clamping slot 120 is located at one end of the object stage 100 to facilitate the insertion of the test strip 300 into the object stage 100 from the end of the object stage 100. When a liquid sample is added to the entire elongated test strip 300, the weight of the liquid causes the middle portion of the test strip to bend downwards, and when the middle portion liable to downward bending is supported by the boss, it ensures that the entire test strip is in an almost identical plane when being at the detection position. Thus, in order to ensure that the test strip 300 is better supported, the centers of the bosses 111 are located in the same line as the center of the first clamping slot 120 and the center of the second clamping slot 130. That is, when the test strip 300 is located on the object stage 100, the bosses 111 are located directly below the test strip 300 while the two ends of the test strip 300 are located in the first clamping slot 120 and the second clamping slot 130, respectively. The detection plate 200 is placed in an area of the groove 110, and the clamping slots 120 and 130 are placed at the two ends of the test strip. The thickness of the detection plate 200 is greater than that of the test strip 300, so in a preferred design, the depth of the groove 110 is greater than the depths of the first clamping slot 120 and the second clamping slot 130, and in this way after the test strip and the detection plate are placed on the object stage, the detection result areas on the test strip and the detection plate can be located at the same height and in a suitable light source area. In a more specific embodiment, in order to ensure that the test strip is located at the same horizontal height, the height of the bosses 111 in the groove 110 is the same as the height of the first clamping slot 120 and the second clamping slot 130 over the groove 110; or, the groove 110 has the same depth as the clamping slots 120 and 130 to facilitate monolithic molding during fabrication, and meanwhile, both the first clamping slot 120 and the second clamping slot 130 are provided with bumps 122 and 132 therein having the same height as the bosses 111 in the groove, so as to ensure that the test strip 300 located in the clamping slots and the groove is in a horizontal state. The widths of the first clamping slot 120 and the second clamping slot 130 are the same as the width of the test strip 300, so that the clamping slots can better clamp and position the test strip. Alternatively, the two ends of the first clamping slot 120 are provided with openings 121 having the same width as the test strip 300. That is, the first clamping slot 120 is fixed to one end of the test strip 300 by clamping the side walls of the test strip 300 at the openings 121 of the first clamping slot. Meanwhile, the second clamping slot 130 has an opening 131 at one end; and symmetrical bulges 133 are disposed at the opening 131. And, symmetrical bulges 133 are disposed on the two side walls at the tail end of the second clamping slot 130. The spacings between the bulges 133 at the opening 131 of the second clamping slot and between the bulges 133 on the side walls are the same as the width of the test strip 300. The other end of the test strip is fixed in the second clamping slot 130 by the contact of the bulges 133 at the opening and the bulges 133 on the side walls with the side walls of the strip 300.

In the embodiment as shown in FIGS. 12-13, the test strip positioning structure provided on the same side as the object stage 100' and the recessed holes is pins 134', which are located in a straight line with the object stage recessed holes 111'. Meanwhile, the test strip 300' is provided with test strip holes 301'. When the test strip 300' is located on the object stage 100', the test strip holes 301' directly hitch the pins 134', so that the test strip 300' is positioned. Of course, the test strip positioning structure can also include a first clamping slot 120 and a second clamping slot 130, the pins 134' are located in the first clamping slot 120 and the second clamping slot 130, and the test strip 300 is positioned by fitting of the first clamping slot 120 and the second clamping slot 130 with the pins 134'. Of course, the test strip positioning structure can also be a combination of the clamping slots 120, 130 and the pins 134', so that the test strip 300' is more firmly fixed.

In the embodiment as shown in FIG. 14, the limiting structure on the object stage 100" is the bosses 111, and the limiting structure of the detection plate 200 corresponding to the same is the recessed holes 211. The test strip positioning structure on the object stage 100" is the pins 134', and the positioning structure for the test strip 300 corresponding to the same is the test strip holes 301'.

The detection plate and the test strip can also be referred to as detection devices, and the detection plate limiting structure and the test strip positioning structure can also be referred to as detection device fixing structures.

A biological sample analyzer for biological sample analysis includes an object stage and a detection unit. The object stage 100 is used in the biological sample analyzer, specifically, the object stage 100 is used to be placed in the detection unit 10 of the biological sample analyzer, the detection plate 200 or the test strip 300 is brought into the detection unit 10, and the detection unit 10 reads, analyzes and feeds back the information of the detection plate 200 or test strip 300 to realize the detection and analysis functions of the biological sample analyzer, as shown in FIGS. 8-14.

Specifically, as shown in FIGS. 1-14, the detection unit 10 includes an object stage, an object stage transfer platform, a motion mechanism, and an optical detection mechanism. More specifically, the detection unit 10 includes the object stage 100 or 100' or 100", the transfer platform including a carrier plate 400, the motion mechanism including a motor 600 and a gear 700, and the optical detection mechanism including a light source (e.g., a hexagonal head 900) and a detection photoelectric PCB 800. The hexagonal head is an optical detection channel having 6 LEDs distributed in a circle around it and a PD receiving channel located in the middle, and is assembled with the detection photoelectric PCB and then mounted on a gantry support. The motor 600 is connected with the gear 700, which engages with the gear of the carrier plate 400, and meanwhile, the gear 700 and the hexagonal head 900 and the detection photoelectric PCB 800 are all connected to the gantry support 500. The motor 600 drives the gear 700 to rotate, and the gear 700 drives the carrier plate 400 to reciprocate linearly move on the gantry support 500 through gear engagement, and finally drives the object stage 100 located on the carrier plate 400 to linearly enter and exit the gantry support 500. Thus, the object stage 100 enters the gantry support 500, and the information on the detection plate 200 or the test strip 300 located on the object stage 100 is read through fitting of the hexagonal head 900 and the detection photoelectric PCB 800. Moreover, the object stage 100 leaves the gantry support 500 to achieve the functions of replacing the detection plate 200 or the test strip 300 on the object stage 100 and taking down the object stage 100 for cleaning.

The object stage 100 is placed on the carrier plate 400, and in the example as shown in FIGS. 8 to 11, the object stage 100 is detachably fixed to the carrier plate 400. In one specific embodiment, as shown in FIG. 11, the carrier plate 400 fits the object stage 100 by the suction of magnetic blocks to achieve the detachable assembly of the carrier plate and the object stage. Specifically, magnetic holes, which are disposed at the two ends of the back side of the object stage, are a first magnetic hole 102 and a second magnetic hole 102' respectively; magnetic holes, which are disposed at the two ends of the carrier plate, are a first magnetic hole 402 and a second magnetic hole 402' respectively; the magnetic block 101 is loaded into the first magnetic hole 102, the magnetic block 101' is loaded into the second magnetic hole 102', and similarly, a magnetic block (not shown in the figure) is also pressed into the magnetic hole 402. In addition, the sides, facing the carrier plate, of the magnet blocks 101 and 101' in the first magnetic hole 102 and the second magnetic hole 102' on the object stage have opposite magnetisms, and for example, the side, facing the carrier plate board, of the magnetic block 101 in the first magnetic hole 102 is an S pole, and the side, facing the carrier board, of the magnetic block 101' in the second magnetic hole 102' is an N pole. And, a magnetic block is pressed into each of the magnetic holes 402 and 402' of the carrier plate 400, and said magnetic block attracts the magnetic block on the back side of the carrier plate. That is, a magnetic block is pressed into the first magnetic hole 401 of the carrier plate corresponding to the first magnetic hole 102 on the object stage, and the side of said magnetic block facing the object stage is an N pole; a magnetic block is pressed into the second magnetic hole 402' of the carrier plate corresponding to the second magnetic hole 102' on the object stage, and the side of said magnetic block facing the carrier plate is an S pole. According to the principle of magnetisms that likes repel each other and opposites attract each other, the object stage can only be placed on the carrier plate with 102 corresponding to 402 and 102' corresponding to 402', so that the magnetic blocks in the magnetic holes attract each other. If 102 corresponds to 402' and 102' corresponds to 402 by mistake, the magnetic blocks in the magnetic holes repel each other, and the object stage cannot be placed on the carrier plate. This can ensure that the direction of the object stage won't be misplaced on the carrier plate.

The operation will be described below with respect to the detection unit 10 of the embodiment in FIGS. 8-10 of the present invention.

The detection plate 200 of this embodiment is exemplified by an HCG detection plate, in which a test strip for detecting HCG is placed. The test strip 300 in this embodiment is exemplified by urinalysis test strip for testing 11 or 12 items of routine urine test. When an operator needs to detect the HCG in a urine sample, the object stage 100 is driven by the carrier plate 400 through control of the motor 600 to move out of the gantry support 500, and the detection plate 200 is placed in the groove 110 of the object stage, so that the recessed holes 211 of the detection plate 200 snap the bosses 111 in the groove in one-to-one correspondence, and the urine sample is added to a sample addition hole on the detection plate. Then, after the carrier plate 400 is driven to drive the object stage 100 to move to a position under the gantry support 500, the hexagonal head 900 and the detection photoelectric PCB 800 read and analyze the detection information on the detection plate 200. After completion of the detection, the motor 600 drives the carrier plate 400 to drive the object stage 100 to move away from the gantry support 500, and the detection plate 200 is taken down. If the urine test paper is immediately to be used for routine urine test, the object stage 100 is driven by the carrier plate 400 to moved out of the gantry support 500, and the test strip 300 is placed in the first clamping slot 120 and the second clamping slot 130 of the object stage, so that the test strip 300 is clamped in the first clamping slot 120 and the second clamping slot 130, and meanwhile, the middle portion of the test strip 300 is located on the bosses 111 to obtain support. Then, after the carrier plate 400 is driven to drive the object stage 100 to move to a position under the gantry support 500, the hexagonal head 900 and the detection photoelectric PCB 800 read and analyze the detection information on the test strip 300. After completion of the detection, the motor 600 drives the carrier plate 400 to drive the object stage 100 to move away from the gantry support 500, and the test strip 300 is taken down. The object stage described in the present invention can hold both the urine test strip for detection and the HCG plate for detection. It is not necessary to move the object stage during conversion of the urine test paper and the detection plate.

After completion of all detections, the motor 600 drives the object stage 100 to move to a position under the gantry support 500 for storage. When it is necessary to clean the object stage 100, the motor 600 moves the carrier plate 400 and the object stage 100 out of the gantry support 500, then the object stage 100 is taken down from the carrier plate 400 for cleaning, and after completion of the cleaning, the magnetic block 101 of the object stage is correspondingly absorbed and connected to the magnetic block 401 of the carrier plate by magnetic suction. Then the motor 600 moves the carrier plate 400 and the object stage 100 into the gantry support 500.

Please refer to FIGS. 1-40, the present invention further provides a transfer platform for an analyzer, including a movable carrier plate 400 and an object stage 100. The carrier plate 400 can be driven by the motor 600 and the gear 700, etc. for reciprocating motion. The object stage 100 is placed on the carrier plate 400 and is separable from the carrier plate 400. The side of the carrier plate 400 facing the object stage 100 is the upper surface 410 and the reverse side is the lower surface 411. The side of the object stage 100 facing the carrier plate 400 is the lower surface 151 and the reverse side is the upper surface 152 (FIG. 19). The object stage 100 and the carrier plate 400 are provided with magnetic blocks 101, 401 respectively, which are magnetically attractive. When the object stage 100 is placed in a predetermined area on the carrier plate 400, the suction of the magnetic blocks 101, 401 causes the object stage 100 to automatically move to a specified position on the carrier plate 400, thereby achieving automatic positioning of the object stage 100 relative to the carrier plate 400.

Please refer to FIGS. 15-18B, this is the first embodiment of the present invention. The upper surface 410 of the carrier plate 400 is provided with depressed areas 412, 413 respectively in the area close to the magnetic blocks 401, 401' on the carrier plate, preferably at positions directly above where the two magnetic blocks 401, 401' are placed on the carrier plate (as shown in FIGS. 18A and 18B). The depressed areas 412, 413 have a rectangular, square, round or oval outline (only the rectangular shape is shown in FIGS. 15 and 16, and other shapes are omitted), and the area of the outline is larger than that of the outer outline of the magnetic block 101 inside the object stage 100. Therefore, when the object stage 100 is placed on the carrier plate 400, it is only necessary to place the magnetic blocks 101, 101' inside the object stage 100 into the depressed areas 412, 413 (i.e., the preset areas) on the upper surface 410 of the carrier plate 400, respectively, there's still a movable space for the magnetic blocks 101, 101' inside the object stage 100 in the depressed areas 412 and 413 on the upper surface 410 of the carrier plate 400, and it is unnecessary to place the magnetic blocks in precise positioning positions. Under the suction of the magnetic blocks, the magnetic blocks in the object stage 100 and the carrier plate 400 are close to each other as much as possible, so as to drive automatic and precise positioning of the object stage 100 and the carrier plate 400, thereby achieving the technical effect of blind positioning. Since the outline of the depressed areas 412, 413 is rectangular, square, round or oval, and the area of the outline is larger than that of the outer outline of the magnetic blocks 101, 101' inside the object stage 100, it is easy to place the magnetic blocks 101, 101' on the object stage into the depressed areas 412, 413 respectively, so that the operation is very convenient. For more precise positioning, the transfer platform for the analyzer of the present invention includes two pairs of magnetic blocks 101, 101' spacing at a suitable distance from each other (they are arranged along the longitudinal direction of the object stage 100 and the carrier plate 400, respectively; for the sake of simplicity, the structure and position way of only one pair of magnetic blocks is described in detail below, and the other pair of magnetic blocks can be analogous). The two magnetic blocks 101 and 101' on the object stage 100 have opposite polarities in the same direction (e.g., a vertically downward direction); and the two magnetic blocks 401 and 401' on the carrier plate 400 have opposite polarities in the same direction (e.g., a vertically downward direction). Therefore, the magnetic blocks on the object stage 100 and the corresponding magnetic blocks on the carrier plate 400 are arranged in a manner that opposites attract each other (the arrangement manner as below).

| | | Solution 1 | | Solution 2 | |
|---|---|---|---|---|---|
| | | Left end | Right end | Left end | Right end |
| Object stage | Upper | N | S | S | N |
| | Lower | S | N | N | S |

-continued

| | | Solution 1 | | Solution 2 | |
|---|---|---|---|---|---|
| | | Left end | Right end | Left end | Right end |
| Carrier plate | Upper | N | S | S | N |
| | Lower | S | N | N | S |

FIGS. 22 and 23 show two arrangement solutions (which are applicable to all embodiments) for the magnetism of the magnetic blocks on the object stage and the carrier plate.

Please refer to FIGS. 19-21A, this is the second embodiment of the present invention. This embodiment differs from the first embodiment in that the upper surface 410 of the carrier plate 400 and the lower surface 151 of the object stage 100 are provided with positioning structures that fit each other, respectively. In this embodiment, the positioning structure includes vertical walls 416, 153 which are disposed on the upper surface 410 of the carrier plate and the lower surface 151 of the object stage, respectively. When the object stage 100 is placed on the preset area on the carrier plate, the suction of the magnetic block 101 causes the vertical walls 416, 153 to rest against each other, thus realizing automatic positioning. Please refer to FIG. 21A, the axes of the magnetic blocks on the carrier plate 400 and the object stage 100 are not coincident, but deviate by a distance F, which is between 0.5 mm and 3.0 mm, so that the magnetic blocks 101, 401 attract each other, causing the vertical walls 416, 153 to continuously rest against each other. Such a design can ensure more precise positioning of the object stage 100 on the carrier plate 400.

Please refer to FIGS. 24 and 24A, this is the third embodiment of the present invention. This embodiment differs from the first embodiment in that: the depressed areas 412 and 413 on the upper surface 410 of the carrier plate are replaced with two counter bored holes 414 and 414' (as shown in FIG. 24) with outline dimensions corresponding to the outline dimension of the magnetic block 101 protruding from the lower surface 151 of the object stage, respectively. In other words, the upper surface 410 of the carrier plate is provided with counter bored holes 414, 414' directly above its two magnetic blocks 401, 401', with their outlines being adaptive to those of the two magnetic blocks 101, 101' fixed to the object stage (FIG. 24A only takes the pair of magnetic blocks 101', 401' as an example for illustration, and the position relationship of the other pair of magnetic blocks 101, 401 can be obtained by reference). That is, the magnetic block 101' on the object stage at least partially protrudes from the lower surface 151 of the object stage, and can at least partially enter into the counter bored hole 414', but shaking of the magnetic block 101' on the object stage within the counter bored hole 414' in the direction parallel to the upper surface 410 of the object stage is limited to the best. The magnetic block 101' on the object stage is cylindrical, and the counter bored hole 414' in the carrier plate also has a cylindrical outline, with the diameter of the counter bored hole 414' being 0.1-1.0 mm larger than the diameter of the magnetic block 101'. In order to facilitate guiding the magnetic block 101' more easily enter into the counter bored hole 414' in a direction perpendicular to the upper surface 410 of the carrier plate, in one solution of this embodiment, the uppermost opening of the counter bored hole 414' is provided with a guide hole for cone chamfer 418 having a larger size. In a preferred embodiment, the depth L of the chamfer is 0.3-2.0 mm, and the included angle α between the chamfer and the vertical axis of the counter bored hole is between 30 degrees and 60 degrees (preferably 40 degrees). It should be noted that in other solutions of this embodiment, the uppermost openings of the counter bored holes 414, 414' may also not include the guide hole for cone chamfer 418.

Please refer to FIGS. 25-27A, this is the fourth embodiment of the present invention. This embodiment differs from the third embodiment in that the upper surface 410 of the carrier plate is provided with a ramp channel 415 communicated with the counter bored hole 414, and the ramp channel 415 gradually descends from a position farther from the counter bored hole 414 to a position closer to the counter bored hole 414 (the corresponding ramp channel 415' on the other side has a similar structure, and will not be repeated). When the object stage 100 is placed at a predetermined position on the carrier plate 400 (as shown in FIG. 26A), under the suction of the magnetic blocks, the magnetic blocks on the object stage 100 slide into the counter bored holes 414, 414' along the ramp channels 415, 415' approximately in the longitudinal direction of the carrier plate 400, respectively, until the magnetic blocks rest against the side walls of the counter bored holes 414, 414', thereby achieving precise positioning (as shown in FIG. 27A).

Please refer to FIGS. 28-30, this is the fifth embodiment of the present invention. This embodiment combines the structures of the first embodiment and the third embodiment, i.e., it includes the design of both the depressed area 412 and the counter bored hole 414 located in the depressed area 412. When the object stage 100 is placed at a predetermined position on the carrier plate 400 (the magnetic block 101 is placed in the depressed area 412), under the suction of the magnetic block, the magnetic block on the object stage 100 automatically slides into the counter bored hole 414 to rest against the side wall of the counter bored hole 414, thereby achieving precise positioning (as shown in FIGS. 29 and 30).

Please refer to FIG. 28A and FIG. 28B, taking the fifth embodiment as an example, the upper surface 410 of the carrier plate is provided with drainage channels 419, 419' communicated with the counter bored holes 414, 414', respectively, in the areas close to the magnetic blocks 401, 401' on the carrier plate, so as to drain out the leaked liquid arriving here (such as urine) in time. Further, the drainage channel 419 further includes a drainage hole 420. In one design, the bottom of the drainage hole 420 is lower than the bottom of the drainage channel 419, but does not penetrate to the lower surface 411 of the carrier plate. In another design, the drainage hole 420 penetrates to the lower surface 411 of the carrier plate. Moreover, it also possible to place water-absorbing materials at the bottom of the counter bored holes 414, 414' to absorb leaked liquid arriving here. It is also possible to place water-absorbing materials in the drainage channel 419 and/or the drainage hole 420 to absorb leaked liquid arriving here. These water-absorbing materials selected from: water-absorbing filter paper, sponge, a nitrocellulose membrane and a glass fiber membrane.

Please also refer to FIGS. 15, 16, 18A and 20B. The design of the drainage channel 419 and the drainage hole 420 is not only applicable to the fifth embodiment, but also applicable to other embodiments. For example, in the first, second, sixth and seventh embodiments, the upper surface 410 of the carrier plate is provided with the drainage hole 420 communicated with the depressed area, and the drainage hole 420 penetrates to or does not penetrate to the lower surface 411 of the carrier plate. In the third and fourth embodiments, the upper surface 410 of the carrier plate is provided with a drainage channel 419 communicated with the counter bored holes 414, 414', and the drainage channel 419 includes the drainage hole 420, which penetrates to or does not penetrate to the lower surface 411 of the carrier plate.

Please refer to FIGS. 31-35, this is the sixth embodiment of the present invention. This embodiment differs from the aforementioned embodiments in that the positioning structure is different. In this embodiment, the positioning structure includes a bulge 154 and a groove 417 that fit each other, which are disposed on the upper surface 410 of the carrier plate and the lower surface 151 of the object stage respectively, the bulge 154 falls into the groove 417, and the suction of the magnetic block causes the side walls of the bulge 154 and the groove 417 to rest against each other, thereby achieving automatic positioning. In this embodiment, the orthographic projections of the bulge 154 and the groove 417, located on the carrier plate 400 and the object stage 100, on the upper surface 410 of the carrier plate or the lower surface 151 of the object stage, has an outer outline of a wedge shape. When the object stage 100 is placed at a predetermined position on the carrier plate 400 (the bulge 154 is placed in the groove 417), under the suction of the magnetic block, the bulge 154 slides in the groove 417 along the longitudinal direction of the carrier plate 400 (X direction as shown in FIG. 33), until the side walls of the bulge 154 and the groove 417 rest against each other, thereby achieving precise positioning (as shown in FIGS. 34 and 35). Although it shows in the figures that the bulge 154 is designed on the object stage 100 and the groove 417 is designed on the carrier plate 400, it is also possible to design the projection 154 on the carrier plate 400 and design the groove 417 on the object stage 100.

Please refer to FIGS. 36-40, this is the seventh embodiment of the present invention. This embodiment differs from the sixth embodiment in that the outlines of the bulge 154' and the groove 417', located on the carrier plate and the object stage, on the cross section of the carrier plate or the object stage are of a wedge shape or inverted trapezoid shape having a wide top and a narrow bottom. When the object stage 100 is placed at a predetermined position on the carrier plate 400, under the suction of the magnetic block, the bulge 154' slides into the groove 417' in a direction substantially perpendicular to the upper surface 410 of the carrier plate, thereby guiding the object stage 100 to reach a precise positioning position on the carrier plate 400 automatically. Although it shows in the figures that the bulge 154' is designed on the object stage 100' and the groove 417' is designed on the carrier plate 400, it is also possible to design the bulge 154' on the carrier plate 400 and design the groove 417' on the object stage 100.

The above description is only the specific implementations of the present invention, and is not thereby limiting the scope claimed for protection by the present invention. Any equivalent structures or equivalent process transformations made by using the description and the drawings of the present invention, directly or indirectly applied to other related technical fields, are all encompassed in the protection scope of the present invention in a similar way.

The invention claimed is:

1. A transfer platform for a biological sample analyzer, comprising a movable carrier plate comprising a first longitudinal axis and a first lateral axis; and an object stage comprising a second longitudinal axis and a second lateral axis, wherein

US 12,607,642 B2

21 the carrier plate comprises an upper surface configured and arranged to reversibly engage with a lower surface of the object stage such that the first longitudinal axis is parallel to the second longitudinal axis upon engagement, the carrier plate comprises a first magnetic block on the upper surface thereof having a first magnetic polarity configured and arranged in a perpendicular direction relative to the upper surface, and a second magnetic block on the upper surface thereof having a second magnetic polarity configured and arranged in a perpendicular direction relative to the upper surface, wherein the first magnetic block is displaced longitudinally on the upper surface from the second magnetic block, and wherein the first magnetic polarity is opposite to the second magnetic polarity, the object stage comprises a third magnetic block on the lower surface thereof having a third magnetic polarity configured and arranged in a perpendicular direction relative to the lower surface, and a fourth magnetic block on the lower surface thereof having a fourth magnetic polarity configured and arranged in a perpendicular direction relative to the lower surface, wherein the third magnetic block is displaced longitudinally on the lower surface from the fourth magnetic block, and wherein the third magnetic polarity is opposite to the fourth magnetic polarity, and wherein the first, second, third, and fourth magnetic blocks are configured and arranged such that (i) engagement of the upper surface of the carrier plate with the lower surface of the object stage in a first orientation positions the first magnetic block in attractive alignment with the third magnetic block and the second magnetic block in attractive alignment with the fourth magnetic block, thereby positioning the carrier plate relative to the object stage in the first orientation, and (ii) engagement of the upper surface of the carrier plate with the lower surface of the object stage in a second orientation positions the first magnetic block in repulsive alignment with the third magnetic block and the second magnetic block in repulsive alignment with the fourth magnetic block, thereby preventing positioning of the carrier plate relative to the object stage in the second orientation.

2. The transfer platform according to claim 1, wherein the upper surface of the carrier plate and the lower surface of the object stage are provided with positioning structures that fit each other, respectively.

3. The transfer platform for a biological sample analyzer according to claim 1, wherein the third and fourth magnetic blocks on the object stage at least partially protrude from the lower surface of the object stage, the carrier plate is provided with a pair of counter bored holes on the upper surface thereof corresponding to each of the third and fourth magnetic blocks, and the magnetic block protruding on the object stage inserts into the counter bored hole on the carrier plate and rests against the wall of the counter bored hole in the first orientation.

4. The transfer platform according to claim 3, wherein the upper surface of the carrier plate is provided with a ramp channel communicated with the counter bored hole, the ramp channel gradually descending from a position farther from the counter bored hole to a position closer to the counter bored hole.

5. The transfer platform according to claim 2, wherein the positioning structure comprises bulges disposed on the upper surface of the carrier plate and the lower surface of the object stage, respectively, and the suction of the magnetic block causes these bulges to rest against each other in the first orientation.

6. The transfer platform according to claim 2, wherein the positioning structure comprises a bulge and a groove that fit each other, which are disposed on the upper surface of the carrier plate and the lower surface of the object stage respectively, the bulge falls into the groove, and the side walls of the bulge and the groove rest against each other in the first orientation.

7. The transfer platform according to claim 6, wherein the orthographic projections of the bulge and the groove, located on the carrier plate and the object stage, on the upper surface of the carrier plate or the lower surface of the object stage have an outer outline of a wedge shape.

8. The transfer platform according to claim 6, wherein the outlines of the bulge and the groove, located on the carrier plate and the object stage, on the cross section of the carrier plate or the object stage are of a wedge shape or inverted trapezoid shape having a wide top and a narrow bottom.

9. The transfer platform for a biological sample analyzer according to claim 1, wherein the upper surface of the carrier plate is provided with a drainage channel.

10. The transfer platform for a biological sample analyzer according to claim 3, wherein the upper surface of the carrier plate is provided with a drainage hole communicated with the depressed area, the drainage hole penetrating to the lower surface of the carrier plate.

11. The transfer platform according to claim 3, wherein the upper surface of the carrier plate is provided with a drainage channel communicated with the counter bored hole, the drainage channel comprising a drainage hole penetrating to the lower surface of the carrier plate.

12. The transfer platform according to claim 1, wherein the object stage further comprises a limiting structure.

13. A biological sample analyzer comprising the transfer platform of claim 1.

14. The biological sample analyzer comprising the transfer platform of claim 3.

* * * * *